(12) United States Patent
Lord et al.

(10) Patent No.: US 9,661,515 B2
(45) Date of Patent: May 23, 2017

(54) CLOUD-BASED MANAGEMENT PLATFORM FOR HETEROGENEOUS WIRELESS DEVICES

(71) Applicant: wildfire.exchange, inc., San Francisco, CA (US)

(72) Inventors: Martin J. Lord, Saratoga, CA (US); Ihab Abu-Hakima, Los Altos, CA (US); Andrea Goldsmith, Menlo Park, CA (US); Bojan Likar, Cupertino, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 85 days.

(21) Appl. No.: 14/261,317

(22) Filed: Apr. 24, 2014

(65) Prior Publication Data

US 2014/0328190 A1 Nov. 6, 2014

Related U.S. Application Data

(60) Provisional application No. 61/816,011, filed on Apr. 25, 2013, provisional application No. 61/830,990, filed on Jun. 4, 2013.

(51) Int. Cl.

| | |
|---|---|
| *G01R 31/08* | (2006.01) |
| *H04W 24/08* | (2009.01) |
| *H04W 24/02* | (2009.01) |

(52) U.S. Cl.
CPC ........... *H04W 24/08* (2013.01); *H04W 24/02* (2013.01)

(58) Field of Classification Search
USPC ........ 370/329, 252, 310, 331, 338; 455/450, 455/501, 434, 444, 452.1, 453, 522
See application file for complete search history.

(56) References Cited

U.S. PATENT DOCUMENTS

| | | |
|---|---|---|
| 7,315,533 B2 | 1/2008 | Theobold et al. |
| 7,414,978 B2 | 8/2008 | Lun et al. |
| | (Continued) | |

FOREIGN PATENT DOCUMENTS

| | | |
|---|---|---|
| WO | 2012016187 | 2/2012 |
| WO | 2013043869 | 3/2013 |

OTHER PUBLICATIONS

Akhshabi et al., "An Experimental Evaluation of Rate-Adaptation Algorithms in Adaptive Streaming over HTTP", MMSys' 11, Feb. 23-25, 2011, San Jose, CA.

(Continued)

*Primary Examiner* — Phuongchau Ba Nguyen
(74) *Attorney, Agent, or Firm* — Clements Bernard Walker PLLC; Lawrence A. Baratta, Jr.; Christopher L. Bernard

(57) ABSTRACT

A method of managing heterogeneous wireless devices in three or more different types of networks is disclosed. Each type of network uses a different type of radio access technology. The method includes receiving measurement data from a plurality of heterogeneous wireless devices via a control interface, wherein a heterogeneous wireless device provides connections to client devices via one or more of the three or more radio access technologies. The method includes searching, using a processor, for optimized adjustments to one or more parameters associated with one or more of the plurality of heterogeneous wireless devices based at least in part on a set of network optimization goals and the measurement data received from the plurality of heterogeneous wireless devices. The method includes transmitting at least some of the optimized adjustments of the one or more parameters to the one or more of the plurality of heterogeneous wireless devices.

20 Claims, 22 Drawing Sheets

(56) References Cited

U.S. PATENT DOCUMENTS

| | | | |
|---|---|---|---|
| 7,953,403 B2 | 5/2011 | Nientiedt | |
| 8,681,810 B2 | 3/2014 | Nandagopalan et al. | |
| 8,750,894 B1 | 6/2014 | Stogaitis et al. | |
| 8,798,021 B2 * | 8/2014 | Mangalvedhe | H04W 24/02 370/338 |
| 9,031,591 B2 | 5/2015 | Ma et al. | |
| 9,060,279 B2 | 6/2015 | Ganu et al. | |
| 9,060,289 B2 * | 6/2015 | Chandrasekhar | H04W 24/04 370/338 |
| 9,066,251 B2 * | 6/2015 | Madan | H04W 24/10 370/328 |
| 9,185,619 B2 | 11/2015 | Meshkati et al. | |
| 2006/0258395 A1 | 11/2006 | Cave et al. | |
| 2007/0149172 A1 | 6/2007 | Dickinson et al. | |
| 2007/0242621 A1 | 10/2007 | Nandagopalan et al. | |
| 2008/0090575 A1 | 4/2008 | Barak et al. | |
| 2009/0257380 A1 | 10/2009 | Meier | |
| 2009/0279427 A1 | 11/2009 | Ji et al. | |
| 2009/0316585 A1 | 12/2009 | Srinivasan et al. | |
| 2009/0323632 A1 | 12/2009 | Nix | |
| 2010/0029282 A1 | 2/2010 | Stamoulis et al. | |
| 2010/0167777 A1 | 7/2010 | Raghotaman et al. | |
| 2011/0039554 A1 | 2/2011 | Bims | |
| 2011/0151886 A1 | 6/2011 | Grayson et al. | |
| 2012/0002567 A1 | 1/2012 | Sun et al. | |
| 2012/0009909 A1 | 1/2012 | Lau | |
| 2012/0087268 A1 | 4/2012 | Savoor et al. | |
| 2012/0088482 A1 | 4/2012 | Pazhyannur et al. | |
| 2012/0122503 A1 * | 5/2012 | Ma | H04W 16/10 455/501 |
| 2012/0257585 A1 | 10/2012 | Sydor et al. | |
| 2014/0092765 A1 * | 4/2014 | Agarwal | H04W 24/02 370/252 |
| 2014/0126410 A1 * | 5/2014 | Agarwal | H04W 24/02 370/252 |

OTHER PUBLICATIONS

Chambelin et al., "Evaluation of neighbors impact on channel allocation for dense environment and Video use cases", Jan. 17, 2011.

"Cisco Visual Networking Index:Global Mobile Data Traffic Forecast Update, 2012-2017", Cisco White Paper, Feb. 6, 2013.

Donald C. Cox, "Wireless Network Access for Personal Communications", IEEE Communication Magazine, Dec. 1992, pp. 96-115.

Neil Hughes, "iPhone 4 keynote plagued by high-tech Wi-Fi meltdown", Jun. 7, 2010, http://www.appleinsider.com/articles/10/06/07/iphone_4_keynote_plagued_by_high_tech_wi_fi_meltdown/.

Jamieson et al., "Understanding the Real-World Performance of Carrier Sense", SIGCOMM'05 Workshops, Aug. 22-26, 2005, Philadelphia, PA.

Kaynia et al., "Improving the Performance of Wireless Ad Hoc Networks Through MAC Layer Design", IEEE Transcations on Wireless Communications, vol. 10, No. 1, Jan. 2011.

Zheng et al., "Diversity and Multiplexing: A Fundamental Tradeoff in Multiple Antenna Channels", IEEE Transactions on Information Theory, vol. 1, No. 8, Aug. 2002.

* cited by examiner

CLOUD-BASED MANAGEMENT PLATFORM FOR HETEROGENEOUS WIRELESS DEVICES

CROSS REFERENCE TO OTHER APPLICATIONS

This application claims priority to U.S. Provisional Patent Application No. 61/816,011 entitled CLOUD-BASED MANAGEMENT PLATFORM FOR HETEROGENEOUS WIRELESS DEVICES filed Apr. 25, 2013 which is incorporated herein by reference for all purposes, and claims priority to U.S. Provisional Patent Application No. 61/830,990 entitled OPEN LAYERED ARCHITECTURE FOR COGNITIVE SOFTWARE DEFINED WI-FI NETWORKS filed Jun. 4, 2013 which is incorporated herein by reference for all purposes.

BACKGROUND OF THE INVENTION

Heterogeneous wireless networks are not without various problems: they are difficult to manage, control, monitor, secure, and optimize. For example, the spectrum allocated to the different types of wireless networks remain scarce, thus limiting the ability of the networks to accommodate the growing demand for mobile data driven by mobile devices, including smartphones and the like. In addition, wireless connectivity can be fragmented, and the roaming between networks is at best ad hoc. In the unlicensed spectral bands, Wi-Fi access points (APs) are deployed in an ad-hoc manner by end-users, enterprises, and hot-spot operators, all sharing the Wi-Fi spectrum using a crude channel sharing mechanism—carrier sense multiple access—that was not designed for the current density of unlicensed wireless devices. Wi-Fi APs are being embedded into other communication devices, such as cable modems and DSL routers, where configuration and management become more challenging due to constrained interfaces and access. The licensed spectral band is also undergoing a paradigm shift with the emergence of Heterogeneous Networks (HetNets), wherein macrocells with large coverage areas are complemented by small cells (micro, pico, and femtocells, some of which have integrated Wi-Fi), the latter being deployed to cover small areas with poor coverage and/or high capacity demands. Currently, stand-alone Wi-Fi APs are configured and managed by their end users, while embedded and hotspot APs are typically pre-configured. Small cells are currently being trialed by operators. The mechanism for how they will be configured and managed when deployed into the field has not yet been fully determined but, due to cost and manpower constraints, is likely to differ from the individual fine-tuning used today for configuration and management of macrocells. In addition, different wireless devices do not possess an efficient and reliable handoff mechanism to switch from one type of network to another, even though such a mechanism can improve the performance of the particular wireless device as well as the overall network performance.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
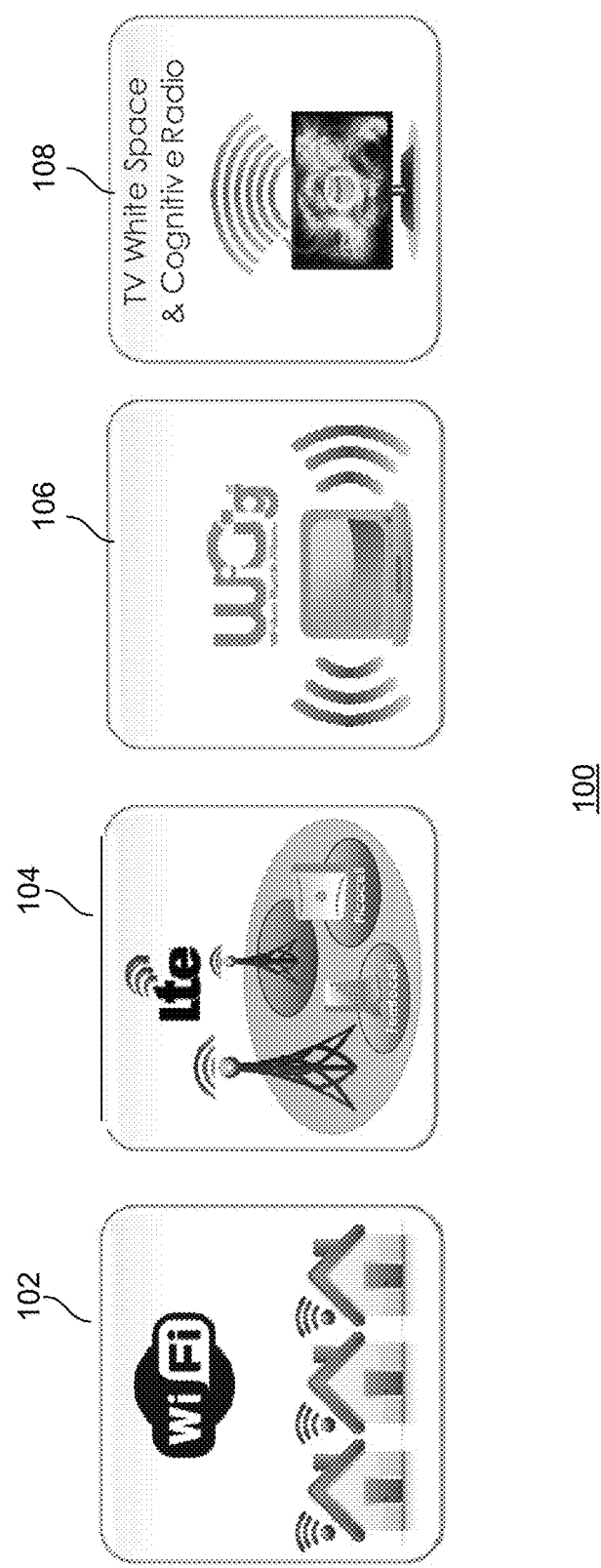
FIG. 1 illustrates one example of a heterogeneous wireless network 100.

Today's wireless networks are ubiquitous and highly heterogeneous. A heterogeneous wireless network (HWN) is a wireless network that includes devices using different underlying radio access technology. FIG. 1 illustrates one example of a heterogeneous wireless network 100. Heterogeneous wireless network 100 includes Wi-Fi networks 102. A Wi-Fi network is a wireless local area network (WLAN) that is based on the Institute of Electrical and Electronics Engineers' (IEEE) 802.11 standards.

Heterogeneous wireless network 100 includes Internet Protocol (IP-based) cellular networks 104, such as cellular networks based on the fourth-generation (4G) Long Term Evolution (LTE) mobile telecommunications technology. LTE networks are increasingly migrating from flat to hierarchical architectures in order to address capacity and coverage issues. Thus, a 4G LTE network may include macrocells and various levels of small cells (e.g., femtocells, picocells, and microcells) with lower power cellular base stations.

Heterogeneous wireless network 100 also includes millimeter wave networks 106. Millimeter waves occupy the frequency spectrum from 30 GHz to 300 GHz. They are found in the spectrum between microwaves (1 GHz to 30 GHz) and infrared (IR) waves, which is sometimes known as the extremely high frequency (EHF) band. The wavelength ($\lambda$) for millimeter waves is in the 1-mm to 10-mm range. Today, the spectrum from DC through microwave (6 GHz) is close to being fully deployed. Millimeter waves thus partially alleviate the problem by providing more room for expansion. However, millimeter waves typically have shorter transmission ranges, e.g., a range of 10 meters, unless multiple antenna technology is used to steer energy in a particular direction, which increases range.

Heterogeneous wireless network 100 also includes cognitive radio networks 108. Cognitive radio is a generic term used to describe a radio that is aware of the environment around it and can adapt its transmissions according to the interference it sees. In their simplest embodiments, cognitive radios can recognize the available systems around them and adjust their frequencies, waveforms and protocols to access those systems efficiently. Conceptually, cognitive radios include multiple domains of knowledge, model-based reasoning and negotiation. The knowledge and reasoning can include all aspects of any radio etiquette, such as RF bands, air interfaces, protocols, and spatial as well as temporal patterns that moderate the use of the radio spectrum. An important feature that differentiates cognitive radios from normal radios is their agility along the following dimensions: spectrum agility, technology agility, and protocol agility. Spectrum agility, or frequency agility, refers to the strategies for discovery of available spectrum as well as opportunistic transmission in the identified spectrum. Its operation requires the design of effective algorithms and protocols for appropriate selection of transmission frequencies, coordination and cooperation. Technology agility refers to the operation of a single radio device across various access technologies. Such seamless interoperability can be enabled by multifunction radio technologies, realized as a system on chip (SoC), that can operate for example using disparate technologies such as Wi-Fi, Bluetooth, FM and GPS transceivers. Protocol agility refers to constituting a dynamically reconfigurable protocol stack on radio devices, so that they can proactively and reactively adapt their protocols depending on the devices they interact with. The vision is that cognitive radios equipped with such agility would be a first step towards enabling radios that follow an etiquette in a society of radios. Such cognitive behavior could extend to networks of radios so that they mimic human behavior in civilized society.

Cognitive radio networks extend the software defined radio (SDR) framework to the development of dynamic spectrum access (DSA) algorithms that exploit temporal and spatial variability in the spectrum. This is done via: (a) initial cooperative neighbor discovery and association; (b) spectrum quality estimation and opportunity identification; and (c) radio bearer management. These, in turn, imply a framework that senses neighborhood conditions to identify spectrum opportunities for communication by building an awareness of spectrum policy, local network policy, and the capability of local nodes (including non-cooperative or legacy nodes). The fundamental issues which need to be addressed include understanding the information theoretic limits of such networks, constructing propagation models for such net-works, devising efficient algorithms for spectrum sensing as well as fostering mechanisms for spectrum coexistence.

Heterogeneous wireless networks are not without various problems: they are difficult to manage, control, monitor, secure, and optimize. For example, the spectrum allocated to the different types of wireless networks remain scarce, thus limiting the ability of the networks to accommodate the growing demand for mobile data driven by mobile devices, including smartphones and the like. In addition, wireless connectivity can be fragmented, and the roaming between networks is at best ad hoc. In the unlicensed spectral bands, Wi-Fi access points (APs) are deployed in an ad-hoc manner by end-users, enterprises, and hot-spot operators, all sharing the Wi-Fi spectrum using a crude channel sharing mechanism—carrier sense multiple access—that was not designed for the current density of unlicensed wireless devices. Wi-Fi APs are being embedded into other communication devices, such as cable modems and DSL routers, where configuration and management become more challenging due to constrained interfaces and access. The licensed spectral band is also undergoing a paradigm shift with the emergence of Heterogeneous Networks (HetNets), wherein macrocells with large coverage areas are complemented by small cells (micro, pico, and femtocells, some of which have integrated Wi-Fi), the latter being deployed to cover small areas with poor coverage and/or high capacity demands. Currently, stand-alone Wi-Fi APs are configured and managed by their end users, while embedded and hotspot APs are typically pre-configured. Small cells are currently being trialed by operators. The mechanism for how they will be configured and managed when deployed into the field has not yet been fully determined but, due to cost and manpower constraints, is likely to differ from the individual fine-tuning used today for configuration and management of macrocells. In addition, different wireless devices do not possess an efficient and reliable handoff mechanism to switch from one type of network to another, even though such a mechanism can improve the performance of the particular wireless device as well as the overall network performance.

Figure 2:
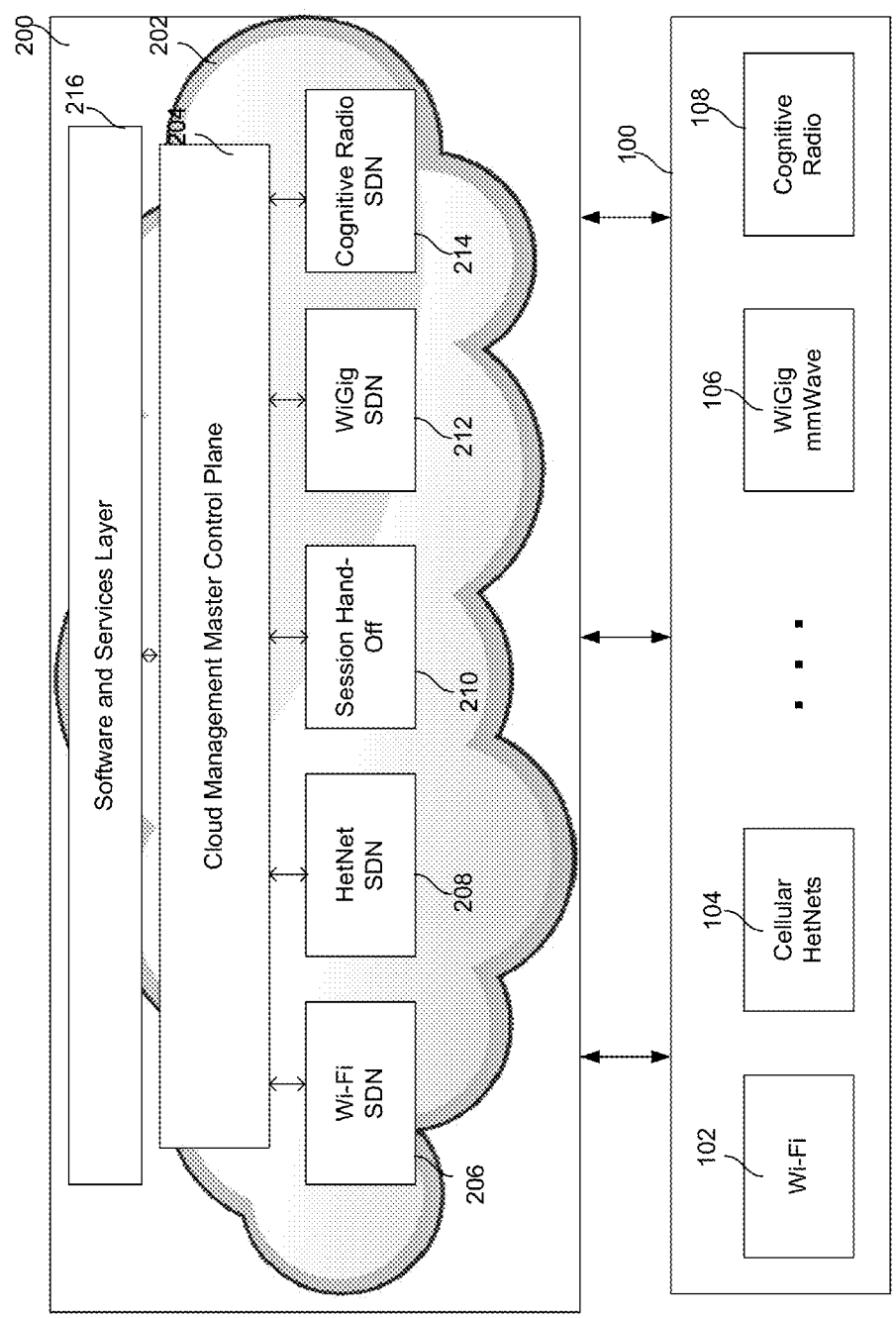
FIG. 2 illustrates a block diagram of an embodiment of a cloud management system 200 providing configuration, monitoring, analytics, security, optimization, and radio resource management of heterogeneous wireless devices.

FIG. 2 illustrates a block diagram of an embodiment of a cloud management system 200 providing configuration, monitoring, analytics, security, optimization, and radio resource management of heterogeneous wireless devices. Heterogeneous wireless devices include Wi-Fi APs, small cell LTE eNodeBs, 2G (second-generation wireless telephone technology) and 3G (third generation of mobile telecommunications technology) cellular base stations, dual-mode Wi-Fi/cellular devices, millimeter wave devices, cognitive radio devices, and other wireless terminals operating in the licensed and/or unlicensed spectral bands. As shown in FIG. 2, cloud management system 200 may reside in a public or private cloud 202. The managed devices are heterogeneous; they can be provided by any hardware vendor and/or use any silicon vendor's chipsets for the underlying wireless functionality. In some embodiments, these heterogeneous devices are managed through an open broadband interface (OBI), which defines the messaging protocol for exchanging information between the wireless devices and cloud management system 200. Other interfaces with generic messaging protocols may alternatively be used. Any existing network can serve as the backbone network over which the OBI operates, and existing management interfaces such as TR-069 (Technical report 069) and SNMP (Simple Network Management Protocol) can be incorporated into the OBI. Parameters of the wireless devices to be adjusted or accessed by cloud management system 200, which are described in greater detail below, are defined by a standard API (application programming interface), which can be supported by some or all of the device manufacturers. For devices that do not support the API, a software agent on the device implemented via open-source software on silicon firmware can provide the same interface functionality as the OBI. In addition, a software application may be downloaded onto the wireless device (e.g., AP or client) for more complete and fine-grained data capture and analytics.

Cloud management system 200 can also support network-initiated seamless roaming between devices in the same networks (e.g., based on the handover protocol in cellular or via a global SSID for Wi-Fi APs) as well as network-initiated handoff between heterogeneous networks (e.g., from LTE to Wi-Fi or vice versa), based on information available in the cloud about network conditions and traffic loads. A monitoring and analytics dashboard (as part of a network operations center or control console) can also be provided to manage and track network status of all wireless devices under cloud management. Additional software and services may also be included in cloud management system 200, including application delivery optimization, traffic shaping, and other application-layer services.

With continued reference to FIG. 2, cloud management system 200 includes a cloud management master control plane 204 that provides management of, or provides communication between, a plurality of software-defined networking (SDN) modules, including a Wi-Fi SDN module 206, a HetNet SDN module 208, a WiGig millimeter wave SDN module 212, and a cognitive radio SDN module 214. Each of the SDN modules provides configuration, monitoring, analytics, security, optimization, and radio resource management of its corresponding type of wireless network. For example, Wi-Fi SDN module 206 provides configuration, monitoring, analytics, security, optimization, and radio resource management of Wi-Fi networks 102. Because each of the SDN modules collects information from its networks, the collected information can be used by cloud management master control plane 204 to globally manage the entire heterogeneous wireless network 100. For example, the collected information can be used for cloud-based radio resource management, including channel allocation, power control, resource allocation, energy optimization, QoS (Quality of Services) optimization, traffic shaping, and the like, for the entire heterogeneous wireless network 100. In another example, the collected information may be used by a session handoff module 210 for providing network-initiated handoffs between heterogeneous networks (e.g., from LTE to cognitive radio or vice versa) which takes into consideration the overall network performance and other factors such as cost, energy consumption, and user preferences.

With continued reference to FIG. 2, a software and services layer 216 is layered on top of cloud management master control plane 204. The software and services provided may include video delivery, data service, home security, enterprise service, targeted advertising, per session QoS optimization/prioritization, load balancing, multi-site support, traffic shaping, network resource allocation, and the like.

The OBI serves as the interface between the cloud-managed heterogeneous devices and cloud management system 200. The OBI includes transport protocols, security protocols, and application data protocols. It is a configuration and monitoring interface that enables device registration, tracking, and dynamic configuration. Robust security is required to ensure integrity of the individual devices as well as the overall network. The OBI can be implemented based on a standard API (e.g., demonstrated via open-source codes such as OpenWRT) or via a software agent that resides on the devices. It may use existing management interfaces such as TR-069, SNMP, Thrift, HTTPS, SSH/CLI, and command line tools to implement its functionality.

Figure 3:
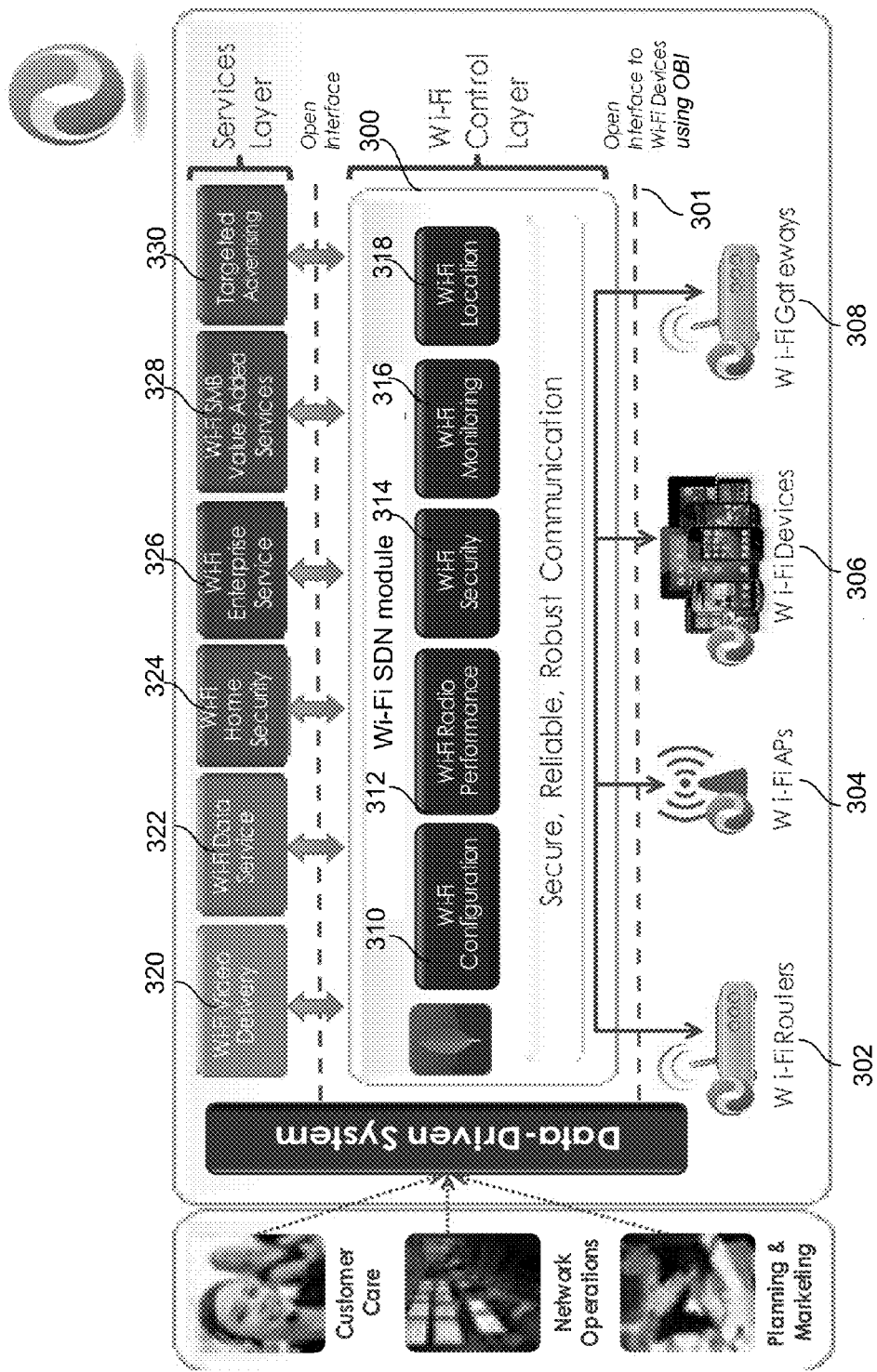
FIG. 3 illustrates a block diagram of an embodiment of a Wi-Fi SDN module 300 and a plurality of services supported by Wi-Fi.

FIG. 3 illustrates a block diagram of an embodiment of a Wi-Fi SDN module 300 and a plurality of services supported by Wi-Fi. An OBI 301 serves as the interface between Wi-Fi SDN module 300 and the various heterogeneous Wi-Fi devices, including Wi-Fi routers 302, Wi-Fi APs 304, Wi-Fi devices 306, Wi-Fi gateways 308, and the like. OBI 301 provides secure, reliable, and robust communication between Wi-Fi SDN module 300 and the heterogeneous Wi-Fi devices. Wi-Fi SDN module 300 includes a plurality of sub-modules, including Wi-Fi configuration 310, Wi-Fi radio performance 312, Wi-Fi security 314, Wi-Fi monitoring 316, and Wi-Fi location 318. The software and services provided include Wi-Fi video delivery 320, Wi-Fi data service 322, Wi-Fi home security 324, Wi-Fi enterprise service 326, Wi-Fi SMB (small and medium-sized business) value added services 328, and targeted advertising 330.

Figure 4:
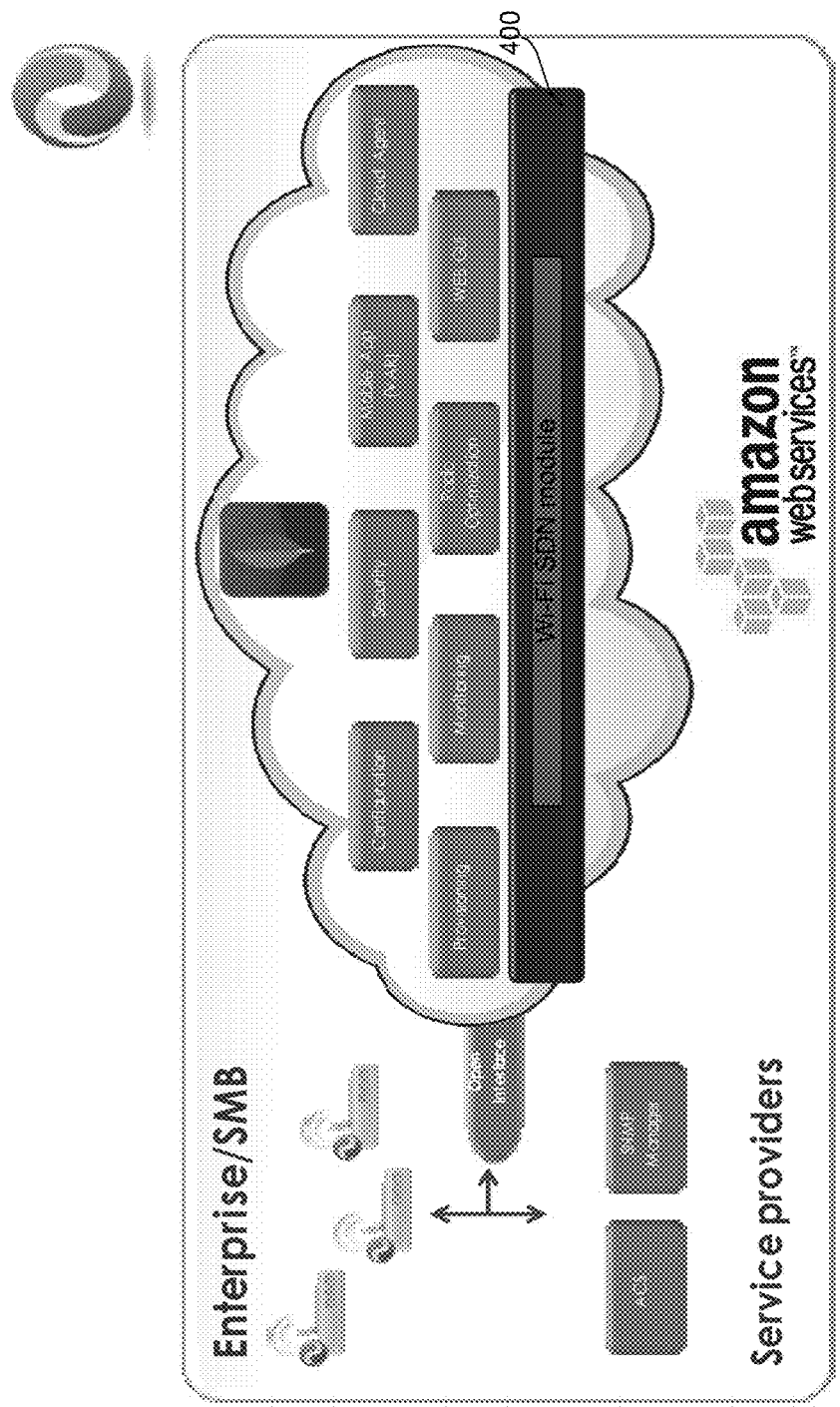
FIG. 4 illustrates another block diagram of an embodiment of a Wi-Fi SDN module 400.

FIG. 4 illustrates another block diagram of an embodiment of a Wi-Fi SDN module 400. Wi-Fi SDN module 400 includes a plurality of sub-modules, including configuration 402, security 404, mobile app 406, cloud agent 408, provisioning 410, monitoring 412, dynamic radio resource management 414, and web GUI 416.

Radio resource management (RRM) 414 is one of many types of optimization that can be provided by cloud management system 200. RRM manages the interference between wireless devices while optimizing overall network performance. RRM can be applied to any wireless device under control of the cloud management system 200; however, the nature of the RRM will depend on the wireless network (e.g., Wi-Fi, LTE, millimeter waves radio, and cognitive radio) to which the optimization is applied. As an illustrative example, dynamic RRM based on Wi-Fi networks is discussed next. However, the cloud-based RRM is not limited to Wi-Fi networks only. Techniques for RRM—which can be developed for any wireless network—include, power control for cellular networks and advanced sensing techniques coupled with dynamic spectrum management for cognitive radio networks.

Figure 5:
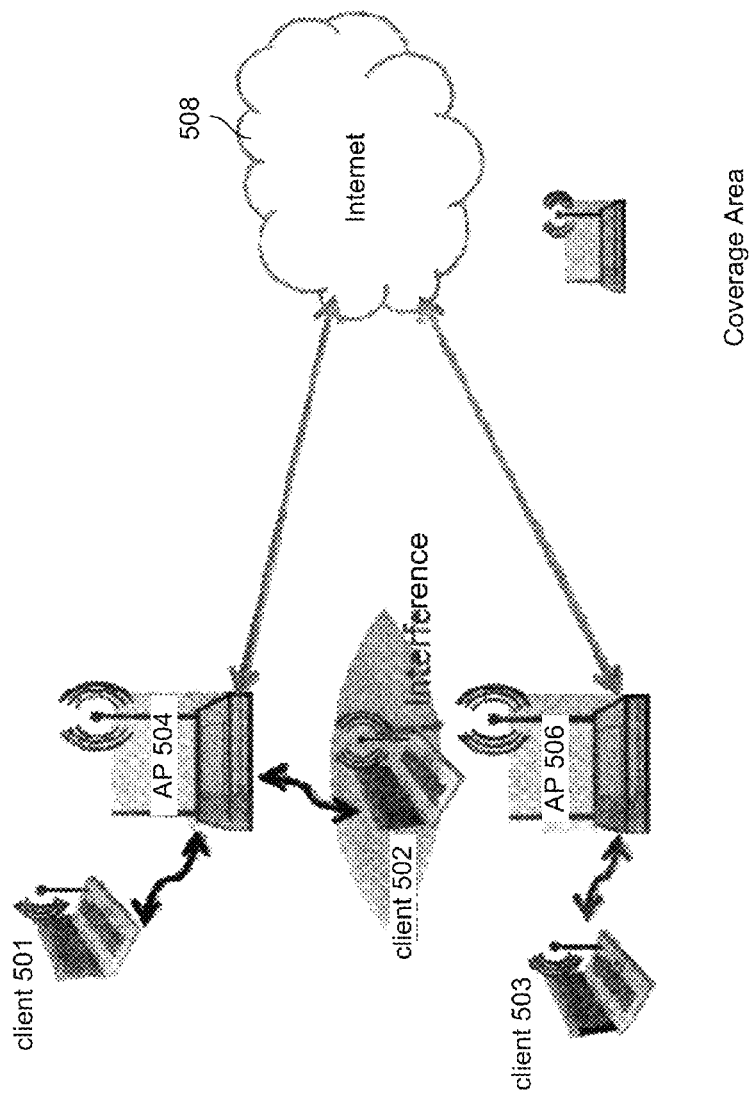
FIG. 5 illustrates a Wi-Fi network, in which a Wi-Fi-enabled client (501, 502, or 503) may connect to any authorized AP (504 or 506) when the client is within the AP's coverage area.

Wi-Fi networks are formed using one or more Wi-Fi APs, which can be deployed in homes, apartments, office buildings, and as outdoor hotspots. FIG. 5 illustrates a Wi-Fi network, in which a Wi-Fi-enabled client (501, 502, or 503) may connect to any authorized AP (504 or 506) when the client is within the AP's coverage area. Once a client is within the coverage area of a particular AP, the signal received by the client generally has a signal strength above the level required for connectivity to that AP. However, clients close to the AP typically receive stronger AP signals than clients farther away from the AP, and enjoy superior performance commensurate with the greater signal strength. APs are connected to the backbone Internet 508, with traffic routed to and from their clients via standard Internet protocols. When a client is within the coverage areas of multiple APs, the AP for the Wi-Fi connection is typically selected based on static client preferences (e.g., a preferred service set ID or SSID) or the best signal strength. For example, client 502 in FIG. 5 is within the coverage areas of two APs (AP 504 and AP 506), but client 502 may connect to AP 504 based on its preferred SSID. Wi-Fi APs operate in both the 2.4 GHz and 5 GHz spectral bands, with channel bandwidths of 20 MHz, 40 MHz, 80 MHz or 160 MHz, depending on the particular Wi-Fi standard used.

One way to reduce the interference experienced by clients in a Wi-Fi network is via channel allocation. FIG. 5 illustrates that clients connected to a particular AP may experience interference caused by other APs within the Wi-Fi network. The wireless channels in a Wi-Fi network are shared across all APs and their clients. When a given channel is used simultaneously by different APs with overlapping coverage areas, the APs create interference to each other's clients, as shown in FIG. 5. The magnitude of this interference depends on many factors, including the propagation conditions, the carrier frequency, and the distance between the interfering AP and the client. The channel allocation mechanism in 802.11 attempts to avoid such interference by assigning different channels to APs within close proximity to each other; this channel assignment may be done manually or based on local measurements. With this orthogonal frequency reuse, the APs use different frequencies and inter-AP interference is minimized. While this channel allocation works well for avoiding interference in low-density AP deployments, in dense deployments there are not enough channels for this method to be viable. For example, only three non-overlapping channels are available in the 2.4 GHz band, making it difficult, and at times impossible, for APs with overlapping coverage areas operating in this band to each be assigned a unique channel.

To mitigate co-channel interference between APs relatively close to each other that are operating on the same channel, a second interference mitigation mechanism—carrier sense multiple access with collision avoidance (CSMA/CA)—is used. CSMA/CA avoids simultaneous transmissions by two APs on the same channel by staggering the two APs' transmissions in time. Prior to transmitting a frame, an AP monitors the wireless channel for other Wi-Fi transmissions with received power exceeding a given carrier sense threshold (CST). The CST defines a carrier sense radius around each transmitting device: any listening device within this radius will detect interference above the CST. The carrier sense radius as a function of azimuthal angle traces out a circle in ideal free-space propagation. In more typical operating environments, the radius as a function of azimuthal angle will have an irregular shape, due to the different shadowing and multipath experienced at different client locations. A random back-off mechanism ensures that listening devices that detect the channel as occupied will not all simultaneously attempt to transmit as soon as the channel becomes unoccupied.

Figures 6A, 6B:
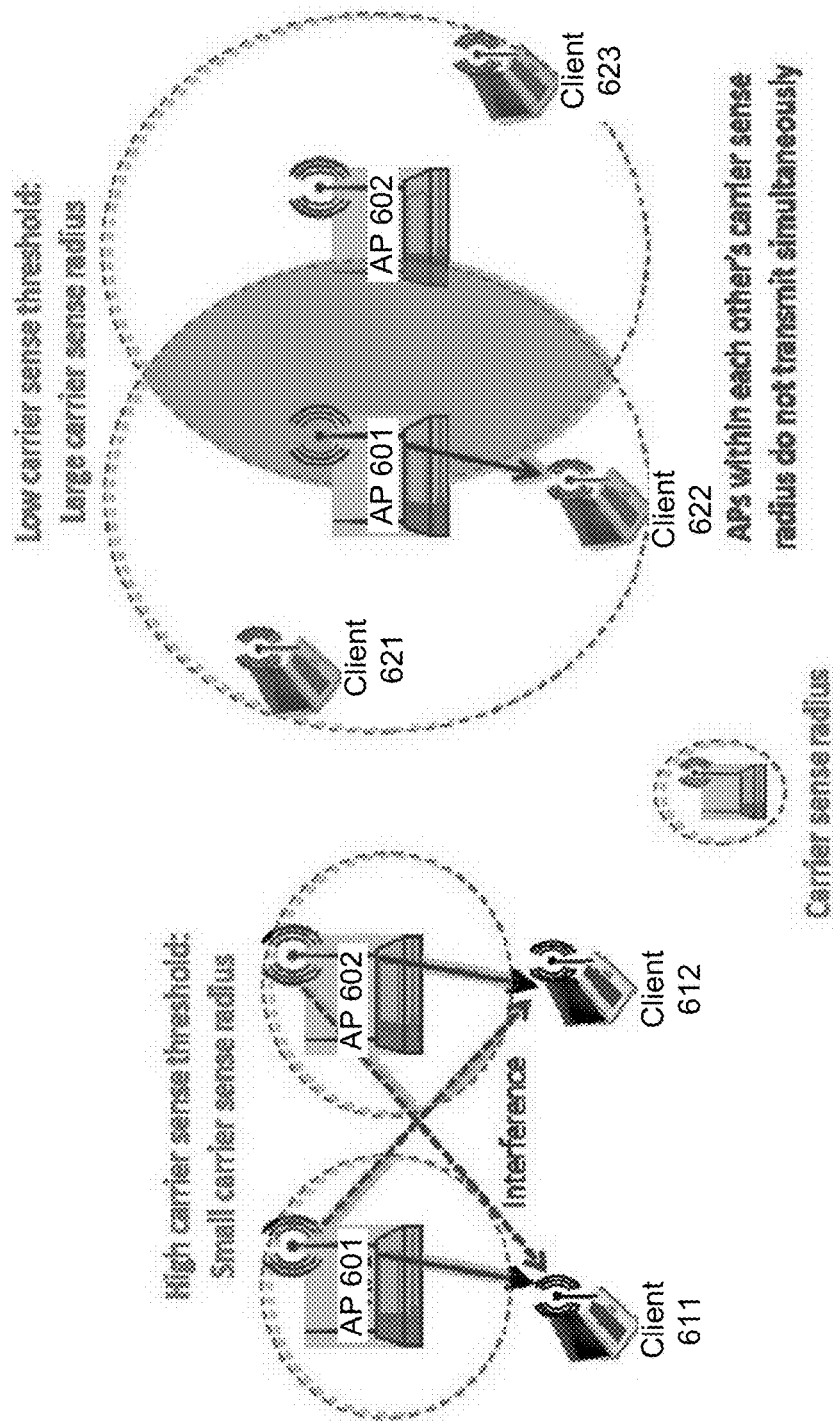
In FIG. 6A, when the CST is high, the carrier sense radius is small.
In FIG. 6B, when the CST is low, the carrier sense radius is large.

Carrier sensing generally works well in low density deployments of APs, where there are sufficient channels to avoid interference between APs and aggressive frequency reuse is not needed. However, in dense deployments, with neighboring APs using the same channel, carrier sensing induces a tradeoff between aggressive frequency reuse and higher levels of interference, as illustrated in FIGS. 6A and 6B. In FIG. 6A, when the CST is high, the carrier sense radius is small. Hence AP 601 and AP 602 will transmit simultaneously, each causing interference to the other AP's client. If this interference does not preclude successful packet reception, then throughput is high; if the interference is sufficiently high so as to cause packet errors, then these packets need to be retransmitted, thereby reducing throughput and increasing delay. In FIG. 6B, when the CST is low, the carrier sense radius is large. This will preclude AP 601 and AP 602 from transmitting simultaneously. If both APs have data to transmit, one will back off, thereby reducing its throughput and increasing delay.

Current Wi-Fi networks use a static CST that can be AP-specific. Selecting static CST rarely optimizes network performance, since whether or not two neighboring APs A and B transmit simultaneously depends on whether the power received from AP A at AP B (and vice versa) is below threshold. This is not the best criterion to use: in particular, packet errors are caused not by the interference between neighboring APs, but are caused by the interference between a given AP and the client associated with the neighboring AP. As shown in FIG. 6B, with a low CST, AP 601 and AP 602 fall within each other's carrier sense radius and hence will never transmit simultaneously. However, since client 621 is far from AP 602, and client 623 is far from AP 601, a transmission from AP 601 to client 621 could occur simultaneously with a transmission from AP 602 to client 623 with minimal interference between them. Fundamentally, whether AP 602 should transmit when AP 601 is transmitting should depend on how that interference impacts the signal received by AP 601's client, i.e. it should depend on the signal-to-interference-plus-noise (SINR) at AP 601's client. In addition to adapting to SINR, CSTs should also adapt to the AP density as more APs are added to the network, as well as adapt to the client data requirements and changing propagation conditions of APs sharing the same channel. Setting the threshold adaptively can both increase throughput and reduce packet error probability.

Figure 7:
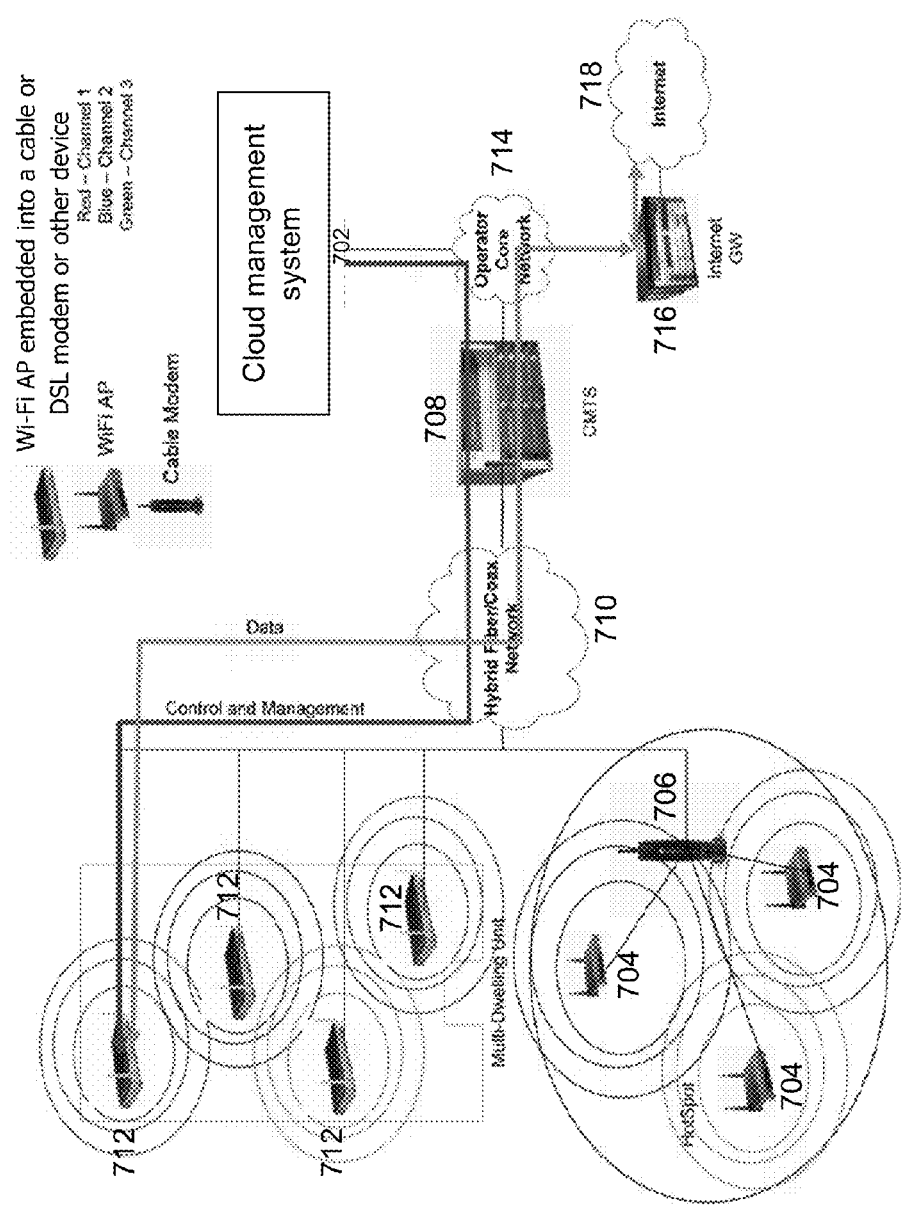
FIG. 7 illustrates an embodiment of a cloud management system 702 for automatically and dynamically configuring and updating Wi-Fi AP parameters in one or more Wi-Fi networks to optimize the overall network performance of the one or more Wi-Fi networks.

FIG. 7 illustrates an embodiment of a cloud management system 702 for automatically and dynamically configuring and updating Wi-Fi AP parameters in one or more Wi-Fi networks to optimize the overall network performance of the one or more Wi-Fi networks. In some embodiments, cloud management system 702 connects to the APs and provides service to the APs as a server. In some embodiments, cloud management system 702 manages tens of thousands (or more) of APs within the one or more Wi-Fi networks.

FIG. 7 illustrates one exemplary embodiment in which the APs are connected to cloud management system 702 and the Internet 718 using cable modems. Note that FIG. 7 is provided as an illustrative example only. Therefore, the present application is not limited to this specific example. For example, the APs managed by cloud management system 702 may be connected to cloud management system 702 using network technologies other than cable modem technologies, including digital subscriber line (DSL) technologies and other Internet technologies.

As shown in FIG. 7, some of the APs managed by cloud management system 702 may be standalone Wi-Fi APs 704. Alternatively, some of the Wi-Fi APs may be embedded into other devices, such as cable modems, DSL modems, and the like. Standalone Wi-Fi APs 704 may be connected to a cable modem 706, and cable modem 706 may be connected to a cable modem termination system (CMTS) 708 via a hybrid fiber-coaxial (HFC) network 710. CMTS 708 may be further connected to cloud management system 702 via an operator core network 714. Data packets that are sent from CMTS 708 to the Internet 718 are routed through an Internet Gateway 716. Some APs (712) managed by cloud management system 702 may be integrated units, each integrating a cable modem and a Wi-Fi AP as a single unit. Integrated units 712 may be connected to CMTS 708 via HFC network 710.

In some embodiments, a software agent is installed on the APs. For example, a piece of software may be installed on an AP by an end-user or a network administrator. In another example, an application may be downloaded from a website, and the application acts as an agent between the AP and cloud management system 702. Cloud management system 702 may manage and configure the parameters of an AP using different protocols, including Simple Network Management Protocol (SNMP), Control And Provisioning of Wireless Access Points (CAPWAP), Technical Report 069/181 (TR-069/TR-181), Command-Line Interface (CLI), Extensible Markup Language (XML), and the like.

Figure 8:
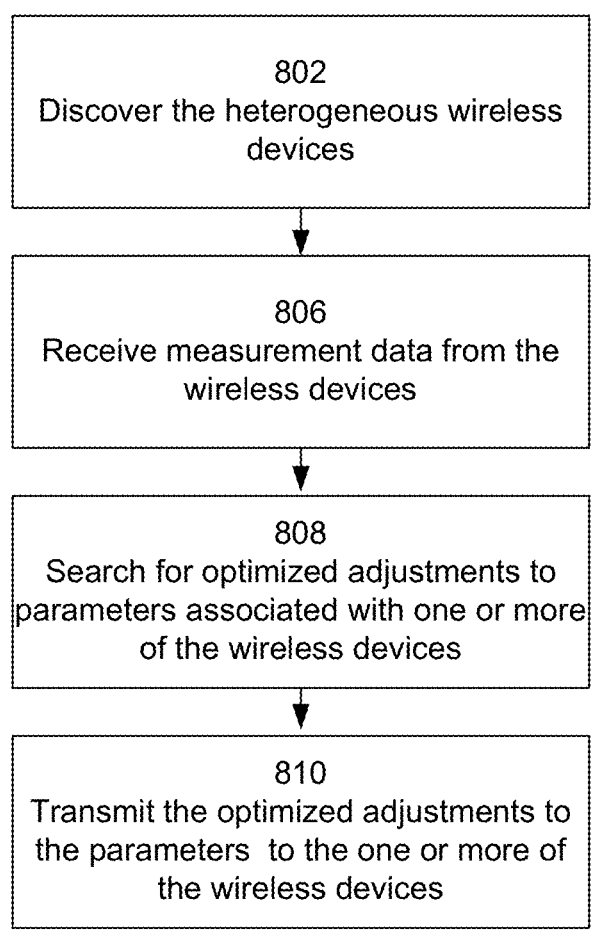
FIG. 8 is a flow chart illustrating an embodiment of a process 800 for automatically and dynamically configuring and updating parameters in one or more networks to optimize the overall network performance.

FIG. 8 is a flow chart illustrating an embodiment of a process 800 for automatically and dynamically configuring and updating parameters in one or more networks to optimize the overall network performance. Examples of heterogeneous network management by the process of FIG. 8 are discussed below, in particular management of Wi-Fi and cellular networks. However, process 800 may be used to configure and update parameters in other types of networks, e.g., LTE networks, millimeter wave networks, and cognitive radio networks, as well. In one example, process 800 may be used to configure and update Wi-Fi AP parameters in one or more Wi-Fi networks to optimize the overall network performance. Process 800 is a process that runs on cloud management system 702 in FIG. 7. As an illustrative example, process 800 is described herein as a process for cloud-based RRM for Wi-Fi networks. Cloud-based RRM for Wi-Fi networks provides interference management and dynamically optimized reuse of spectrum to enhance Wi-Fi capacity, coverage, and overall throughput. It allows an operator or enterprise to ensure reliability and performance predictability, such that the Wi-Fi network achieves carrier-grade performance with low probability of outage. Energy-consumption minimization, potentially based on load, and outage probability minimization can also be incorporated into the algorithm. Cloud-based RRM may adjust the parameters of any given AP in the network to globally optimize its performance metrics. By optimizing parameter settings across all APs under its control, the cloud-based management system can improve network performance and reduce interference far better than a distributed optimization scheme. The parameters which are typically adjusted at each AP include channel allocation, transmit power, carrier sense threshold levels, and multiple-input multiple-output (MIMO) antenna parameters (for 802.11n/ac APs). The RRM global optimization makes use of measurements taken by the APs about both their clients and clients connected to neighboring APs, including receive signal strength (RSSI), channel quality, throughput, and packet error rate. The measurements are sent via the OBI (or other interface) to cloud management system 702, which then computes the configuration parameters for each AP and sends them to the AP through the OBI.

At 802, the heterogeneous wireless devices that are installed in the networks managed by cloud management system 702/200 are discovered. For example, the APs that are installed in the Wi-Fi networks managed by cloud management system 702 are discovered. Cloud management system 702 is configured to manage a heterogeneous group of APs. The APs may support different Wi-Fi protocols, including 802.11a, 802.11c, 802.11g, 802.11n, 802.11ac, and the like. The APs can be made by different third-party vendors. Some of the APs may be purchased off-the-shelf. Therefore, the APs that are managed by cloud management system 702 have a wide range of capabilities, configurable parameters, and interfaces. Cloud management system 702 discovers the APs within the Wi-Fi networks, including their capabilities, configurable parameters, interfaces, and the like. This information may be used by cloud management system 702 to more optimally search for a set of configurable parameters for any AP managed by cloud management system 702 to achieve improved overall network performance. For example, a search algorithm that is run by cloud management system 702 may take into consideration that a particular parameter is not configurable on a particular AP to reduce the search complexity by either searching over a smaller set of configurable parameters or simplifying the search based on a partition of the APs based on their configurability.

At 806, measurement data is received from the wireless devices. For example, measurement data is received from the Wi-Fi APs, such that the measurement data is locally collected by the APs and then sent to cloud management system 702. The measurement data collected by an AP may include data regarding the AP's clients and data regarding clients connected to neighboring APs. The measurement data may include receive signal strength indication (RSSI), channel quality index (CQI), throughput, packet error rate, and the like. RSSI is a measurement of the power present in a received radio signal. CQI is a measurement of the communication quality of wireless channels. In some embodiments, the measurement data is Wi-Fi standard-based measurement data (e.g., 802.11 standard-based measurement data) measured by the APs. In some embodiments, the APs may collect additional measurement data that is optional or not specified in the 802.11 standards.

At 808, adjustments to parameters associated with one or more wireless devices are searched to optimize the overall network performance. For example, adjustments to Wi-Fi parameters associated with one or more APs are searched to optimize the Wi-Fi overall network performance. As cloud management system 702 receives measurement data from many APs, including APs installed in multiple Wi-Fi networks, the measurement data may be used by cloud management system 702 to compute Wi-Fi parameters that can optimize network performance in a global sense, achieving superior network performance.

The Wi-Fi overall network performance may be defined by different metrics. In some embodiments, the metrics may be a set of network optimization goals defined by a network operator. The goals may include increasing the average network throughput, increasing the geometric mean throughput, reducing interference, reducing outage probability, reducing delay, increasing coverage, improving fairness, supporting specific quality-of-service metrics for high-priority traffic, reducing "network" cost or backhaul cost, reducing spectrum cost, reducing infrastructure cost, and the like.

Different Wi-Fi parameters may be dynamically adjusted to optimize the Wi-Fi overall network performance. As will be described in greater detail below, Wi-Fi parameters that can be dynamically and optimally adjusted may include CSTs, channel allocation, transmit power, multiple-input multiple-output (MIMO) antenna parameters, backoff parameters, and the like.

Different optimization techniques may be employed by cloud management system 702 for searching the optimized Wi-Fi parameters. In some embodiments, the network optimization goals are evaluated based at least in part on the measurement data received from the APs. For example, an aggregate network throughput may be computed based on throughput measurement data received from the APs. The set of network optimization goals may be represented by an objective function or a cost function in an optimization problem. An optimized Wi-Fi parameter resulting from the search is a feasible solution or optimal solution that minimizes (or maximizes) the objective function subject to different constraints. Since multiple types of Wi-Fi parameters may be adjusted simultaneously during a search, different techniques to combat interference, increase throughput, or maximize coverage may be leveraged at the same time. For example, instead of determining channel allocation and CST individually or locally, they can be optimized simultaneously in a global sense. Some constraints may be requirement constraints that are configurable by the network operator. For example, one requirement constraint may impose a minimum percentage of AP clients in the Wi-Fi networks with a throughput above a certain threshold.

The optimization may be either distributed or centralized. When the optimization is distributed, the optimization may be based on a cost function for a given user or a given application. The cost function may be a weighted combination of throughput or potential throughput, outage probability, delay, "network" cost or backhaul cost, spectrum cost, infrastructure cost, and the like. When the optimization is centralized, the optimization may be based on a cost function associated with many users or applications. The cost function may be a weighted combination of throughput or potential throughput, outage probability, delay, "network" cost or backhaul cost, spectrum cost, infrastructure cost, fairness, and the like. Each element of the cost function may be weighted based on the element, the user, and/or the application priority.

With continued reference to FIG. 8, at 810, at least some of the optimized adjustments to the one or more parameters are transmitted to the one or more wireless devices. For example, at least some of the optimized adjustments to the one or more Wi-Fi parameters are transmitted to the one or more APs. The received adjustments may be used by the APs for self-configuration, self-optimization, and self-healing, such that the APs can collectively form a self-organizing network.

The received adjustments may be used to initialize an AP that has been recently installed. For example, after an AP is first installed, the AP collects initial measurement data and sends the data to cloud management system 702. Cloud management system 702 then computes the parameters for AP and sends them to the AP for self-configuration.

The received adjustments may be used to re-configure an existing AP. When the existing AP connects to cloud management system 702 for the first time, the existing AP is treated as a new installation for the purpose of network optimization. Cloud management system 702 computes new parameters for the existing AP based on the received measurement data from the existing AP and other APs, and cloud management system 702 sends the new parameters to the existing AP for reconfiguration.

The received adjustments may also be used to periodically update the Wi-Fi parameters of an existing AP. These adjustments are computed based on dynamic, real-time measurements made periodically by the APs.

The received adjustments may also be used by the APs for self-healing any network topology changes. For example, a network topology change may be caused by the failure of an AP. Cloud management system 702 detects the failure, and the parameters of the surrounding APs are automatically adjusted to fill in the resulting coverage hole. In another example, a network topology change may be caused by new APs being installed on a Wi-Fi network. The network topology change may be detected by cloud management system 702, which is triggered by the detection to initiate a new search.

Figure 9:
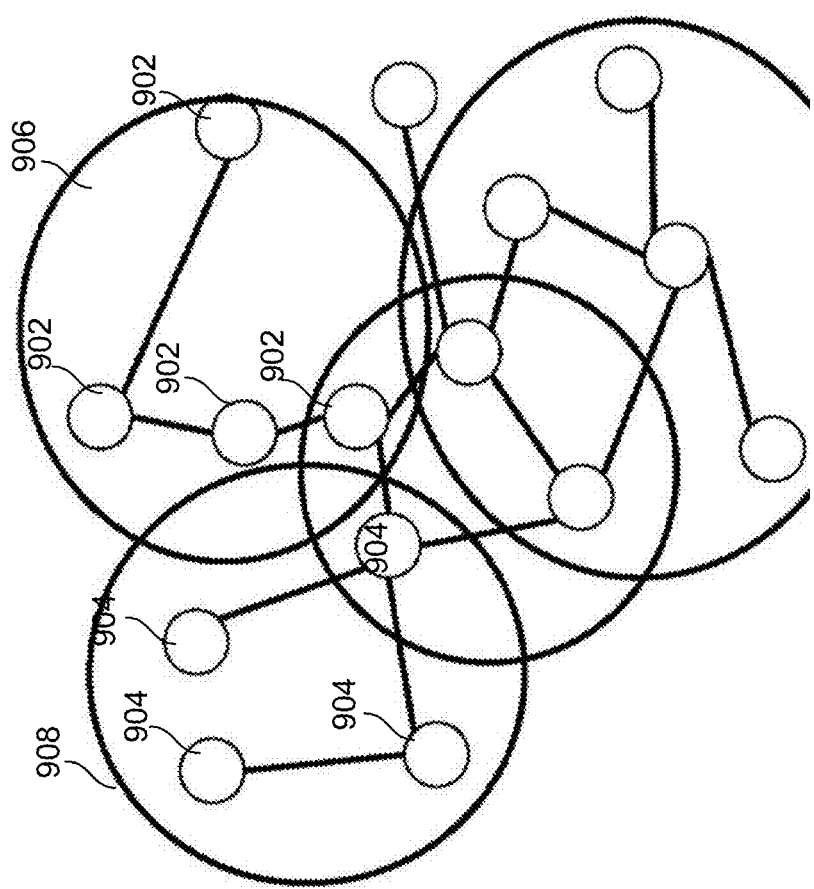
FIG. 9 illustrates that APs may be divided into a plurality of local neighborhoods for local optimization.

In some embodiments, the search performed by cloud management system 702 may create local neighborhoods for local optimization in addition to global optimization. FIG. 9 illustrates that APs may be divided into a plurality of local neighborhoods for local optimization. As shown in FIG. 9, APs 902 within a localized region 906 are grouped together for local optimization. Similarly, APs 904 within another localized region 908 are grouped together for local optimization. A local optimization may be performed prior to a global optimization across the entire network. The local optimization has a lower computational complexity, and it avoids changing parameters across the entire network at the same time. The global optimization avoids local minima that may arise when only local parameters within a neighborhood are accounted for in the local optimization.

Figure 10:
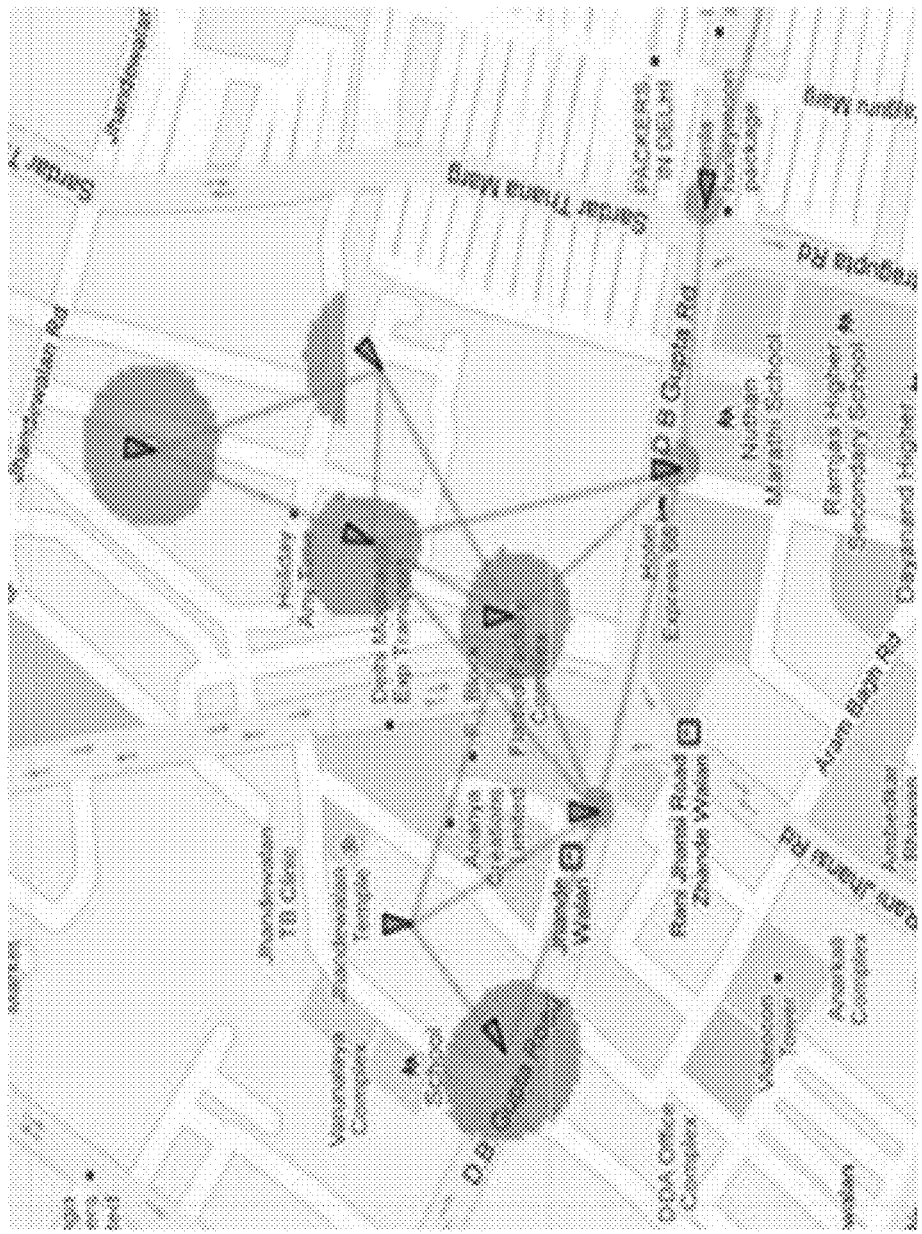
FIG. 10 illustrates that cloud management system 702 can provide throughput maps showing the throughput available at different locations throughout the Wi-Fi network.

The AP coordination enabled by cloud management system 702 provides additional functionality beyond the optimization of AP configuration, including load balancing, power control, coordinated scheduling, cross-layer optimization, seamless handovers, and the like. Cloud management system 702 can perform load balancing by moving a client connected to a heavily congested AP to a nearby AP that is less congested. Cloud management system 702 can also enable seamless session handoff between APs, such that mobile users experience no disruption in a streaming application, such as video. Cloud management system 702 can provide throughput maps showing the throughput available at different locations throughout the Wi-Fi network, as shown in FIG. 10. These maps are generated based on throughput calculations taking into account the RSSI and interference estimates, the measured throughputs of clients and their estimated locations, and the measured noise floor at each AP. Throughput maps identify coverage holes in the network. Moreover, they can also be used to optimize new AP deployments by determining which of several possible locations provides the largest improvement in network throughput and coverage.

Wi-Fi APs operate in the 2.4 GHz and 5 GHz bands. These bands have three and thirteen non-overlapping channels of 20 MHz, respectively. The 802.11a/g standard allows only one 20 MHz channel to be assigned to an AP and its clients, while the 802.11n and 802.11ac standards allow up to two 20 MHz and up to four 40 MHz channels, respectively, to be assigned to each AP. When more than one channel is assigned to an AP, there is the notion of a primary channel and secondary channels. The primary channel is used by an AP to communicate with devices that are restricted to the bandwidth associated with the channel. The secondary channels are used by an AP to communicate with devices that support bandwidths larger than that of the primary channel. For example, in 802.11n, two 20 MHz channels, a primary and a secondary channel, are bonded together to form a 40 MHz channel, but only the primary channel is used for communication with 802.11a/g devices as the latter only support 20 MHz channels. All packet transmissions between an AP and its clients occur either over only the primary channel or over the primary channel as well as one or more secondary channels. The AP generally prioritizes the use of its primary channel in its transmissions. Conversely, the secondary channels can only be used if the interference caused by the AP on this channel is below the CST of neighboring APs on their primary channel. Channel assignment in 802.11 entails assigning each AP a primary channel and one or more secondary channels.

The primary and secondary channel assignments are examples of Wi-Fi AP parameters that can be adjusted dynamically and automatically to optimize the overall network performance based on a set of network optimization goals. The primary and secondary channel assignments are chosen, optimally or sub-optimally, based on the set of network optimization goals. The primary and secondary channel assignments and other types of Wi-Fi parameters may be adjusted simultaneously during a search. However, in some cases, an optimal adjustment may not be available, and cloud management system 702 optimizes the APs' channel assignment as follows:

1. Each AP is typically assigned the maximum bandwidth it can support: 20 MHz for 802.11a/g APs, 40 MHz for 802.11n APs, and 160 MHz for 802.11ac APs. This increases the likelihood that the clients associated with each AP can be served at the highest data rates possible. In some cases, assigning the maximum bandwidth that the AP can support is not the optimum solution in increasing network performance; in such cases, a smaller bandwidth is assigned to that AP.

2. The primary channel assignment scheme is such that the closest APs are assigned non-overlapping primary channels. This minimizes contention when all the APs use only primary channels.

3. Secondary channels (if applicable) are assigned to the APs to minimize interference on the primary channels.

4. Channels are assigned to minimize interference from APs not under the control of cloud management system 702.

5. Channel assignments are periodically re-optimized as the load in each basic service set (BSS) and the associations of clients to a BSS (e.g., due to mobility or load balancing) change over time.

Figure 11:
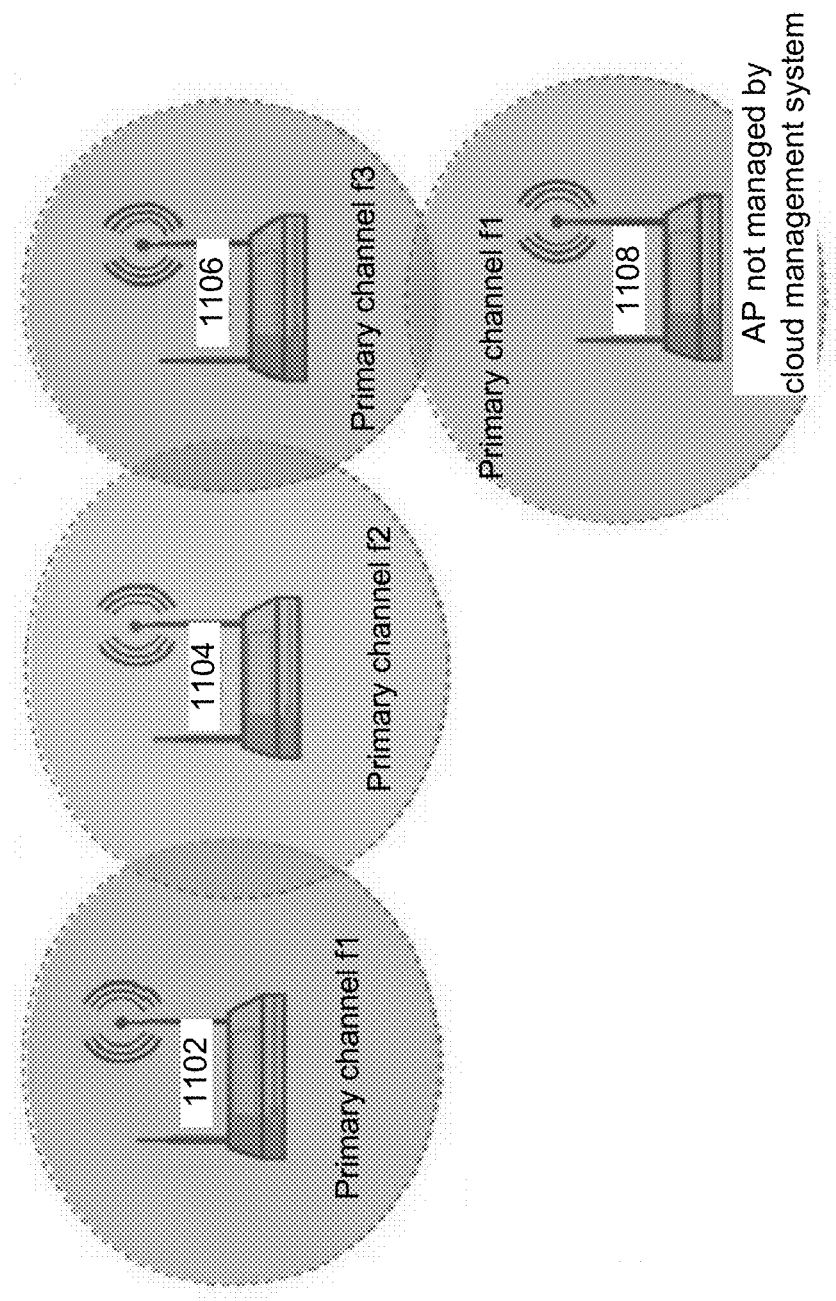
FIG. 11 illustrates an embodiment in which primary channels are assigned such that APs with their primary channels on the same frequency channel are farthest apart.

In some embodiments, cloud management system 702 optimizes the assignment of primary channels of APs such that APs with their primary channels on the same frequency channel, whether controlled by cloud management system 702 or not, are farthest apart. FIG. 11 illustrates an embodiment in which primary channels are assigned such that APs with their primary channels on the same frequency channel are farthest apart. APs 1102, 1104, and 1106 are managed by cloud management system 702, while AP 1108 is not. The primary channels for AP 1102, AP 1104, and AP 1106 are assigned different frequency channels, whereas the primary channel of AP 1108 is assigned the same frequency channel as the AP farthest away, i.e., the primary channel of AP 1102. In some embodiments, simple models for interference are used for optimizing the assignment of the primary channels as described above. In some embodiments, low-complexity computational techniques for approximately solving a combinatorial optimization problem are used for optimizing the assignment of the primary channels as described above. These techniques include belief propagation, convex optimization, and genetic mutation.

Figure 12:
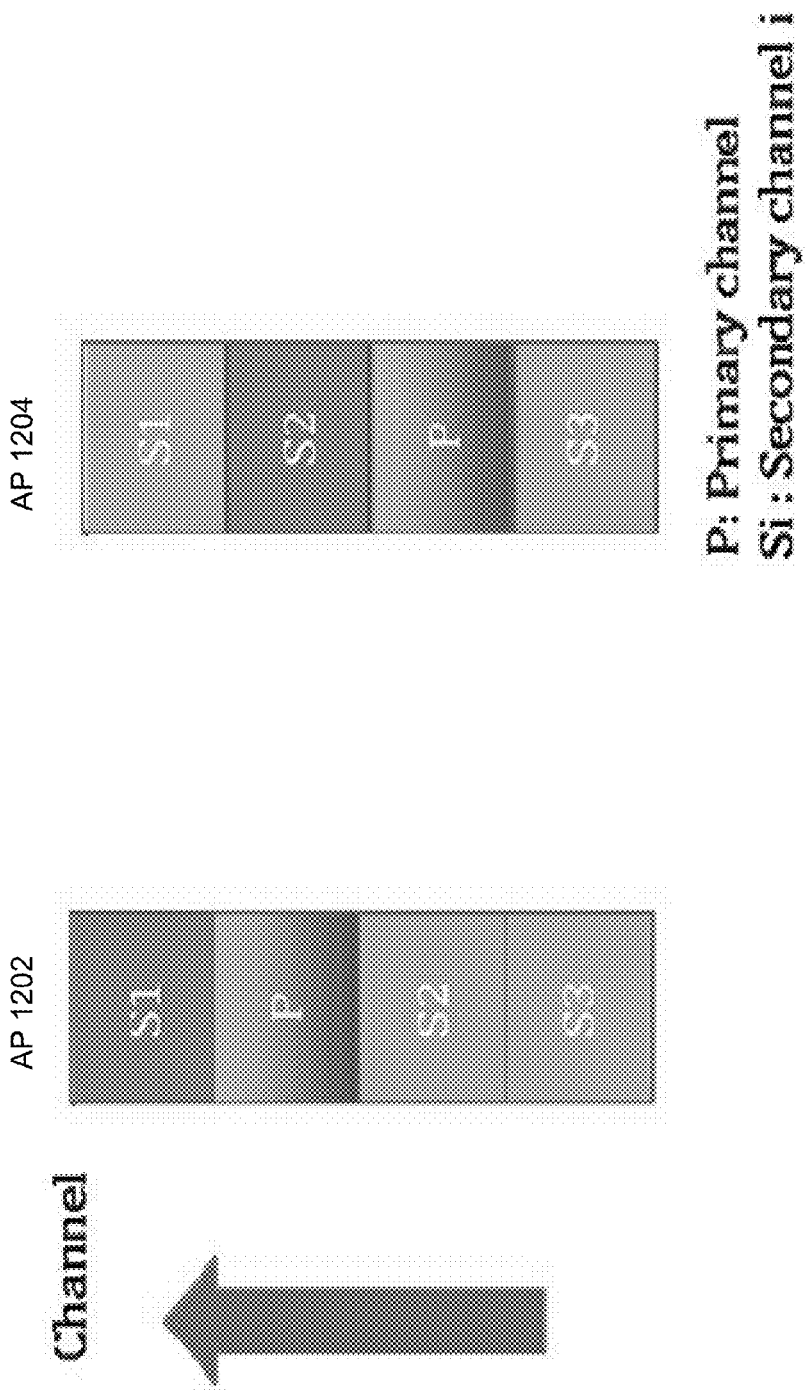
FIG. 12 illustrates that neighboring APs have non-overlapping primary channels (denoted by P), while the secondary channel S2 of each AP overlaps with the primary channel of the other AP.

Given the assignment of primary channels, secondary channels (if applicable) are assigned to the APs to minimize interference on primary channels. However, since the number of channels available is limited and cloud management system 702 first assigns the maximum bandwidth to each AP, an AP's primary channel may overlap with a neighboring AP's secondary channels, as shown in FIG. 12. As indicated in FIG. 12, neighboring APs have non-overlapping primary channels (denoted by P), while the secondary channel S2 of each AP overlaps with the primary channel of the other AP. In addition, secondary channel S1 (or S3) of AP 1202 overlaps with secondary channel S1 (or S3) of AP 1204. Based on the 802.11 standard, AP 1202 can transmit at its maximum power on its primary channel, and will often do so to clients located on the edge of its coverage area. Without dynamic configuration of the CST (i.e., if the CST is set statically), the CST is typically set at a level such that AP 1204 cannot reuse this channel (which is a secondary channel for AP 1204) for transmission when AP 1202 transmits at maximum power. For clients well in the interior of its coverage region, AP 1202 will typically transmit at a lower power on its primary channel and one or more of its secondary channels. If the CST is set statically, it is typically set at a level such that AP 1204 can reuse these channels when AP 1202 transmits at this lower power level. Thus, this results in fractional frequency reuse. As will be described in greater detail below, dynamic adaptation of the CST and dynamic adaptation of power can provide additional degrees of freedom for optimization, resulting in further improved performance.

The transmit power levels of the APs are examples of Wi-Fi AP parameters that can be adjusted dynamically and automatically to optimize the overall network performance based on a set of network optimization goals. Cloud management system 702 also tunes the individual transmit power at APs based on their radio measurements. The transmit power at each AP is selected, optimally or suboptimally, based on the network optimization goals. For example, reducing transmit power at a given AP reduces interference between the given AP and other devices on the same channel. However, this also reduces SNR and RSSI between the AP and its connected devices. Thus, power control optimizes this tradeoff. As another example, CST values can be taken into account while setting the transmit power of an AP. In particular, the transmit power of a given AP can be set such that neighboring APs only back off when their interference to at least one client of the given AP is above a given threshold. This form of power control is especially useful when an AP is serving clients experiencing relatively good channel quality, and hence interference from neighboring APs would not create significant degradation. In addition, cloud management system 702 detects coverage holes via the RF coverage maps as discussed below. Upon detection of a coverage hole, cloud management system 702 increases the transmit power of APs in the vicinity of the coverage hole up to the maximum level to fill in the hole. As another example, transmit power control can be jointly optimized with primary and secondary channel allocation to improve the network optimization.

In some embodiments, cloud management system 702 dynamically adapts the CSTs of the APs. In dense Wi-Fi deployments, if the CST is low, the coverage area of the AP is typically much smaller than its carrier sense radius. As a result, an AP would sense the medium and avoid transmitting to its client, even when the client is far from the interfering AP (e.g., see Client 623 of FIG. 6B) and is thus capable of receiving the transmission from the AP. On the other hand, if the CST is high, a number of transmitters access the same channel simultaneously, creating higher interference, as shown in FIG. 6A. Therefore, the CST value on APs should be set dynamically based on client locations, propagation conditions, load, and network topology.

In some embodiments, cloud management system 702 dynamically adjusts the CST to systematically create periods of high reuse and low reuse. During the high reuse periods, the CST is high, so neighboring APs on the same channel will typically transmit packets simultaneously, leading to high data rates but potentially higher packet loss due to interference. Conversely, during periods of low reuse, neighboring APs transmit at different times in order to protect the weaker links, thereby preventing their outage. This can be achieved by using different CST values during different periods. Specifically, high CST values are used during high reuse periods, while low CST values are used during low reuse periods. The CST values and the division of time between the high and low reuse phases are optimized based on the channel and load measurements. In some embodiments, larger channel bandwidths are assigned to the APs to provide more flexibility to the neighboring APs in reusing the channel in time.

Figure 13:
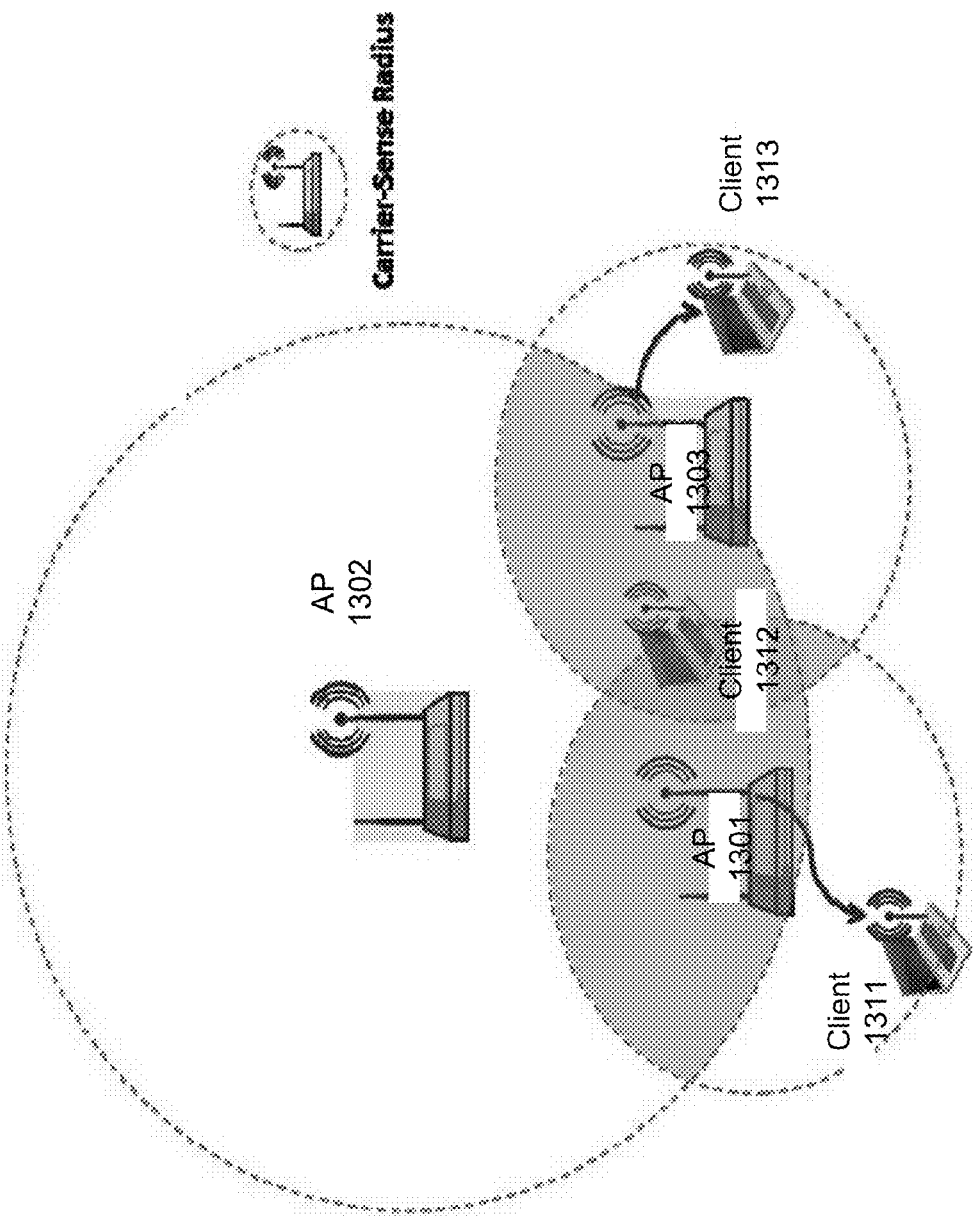
FIG. 13 illustrates the time intervals in which AP 1302 is configured with a low CST while AP 1301 and AP 1303 are configured with high CST values.
Figure 14:
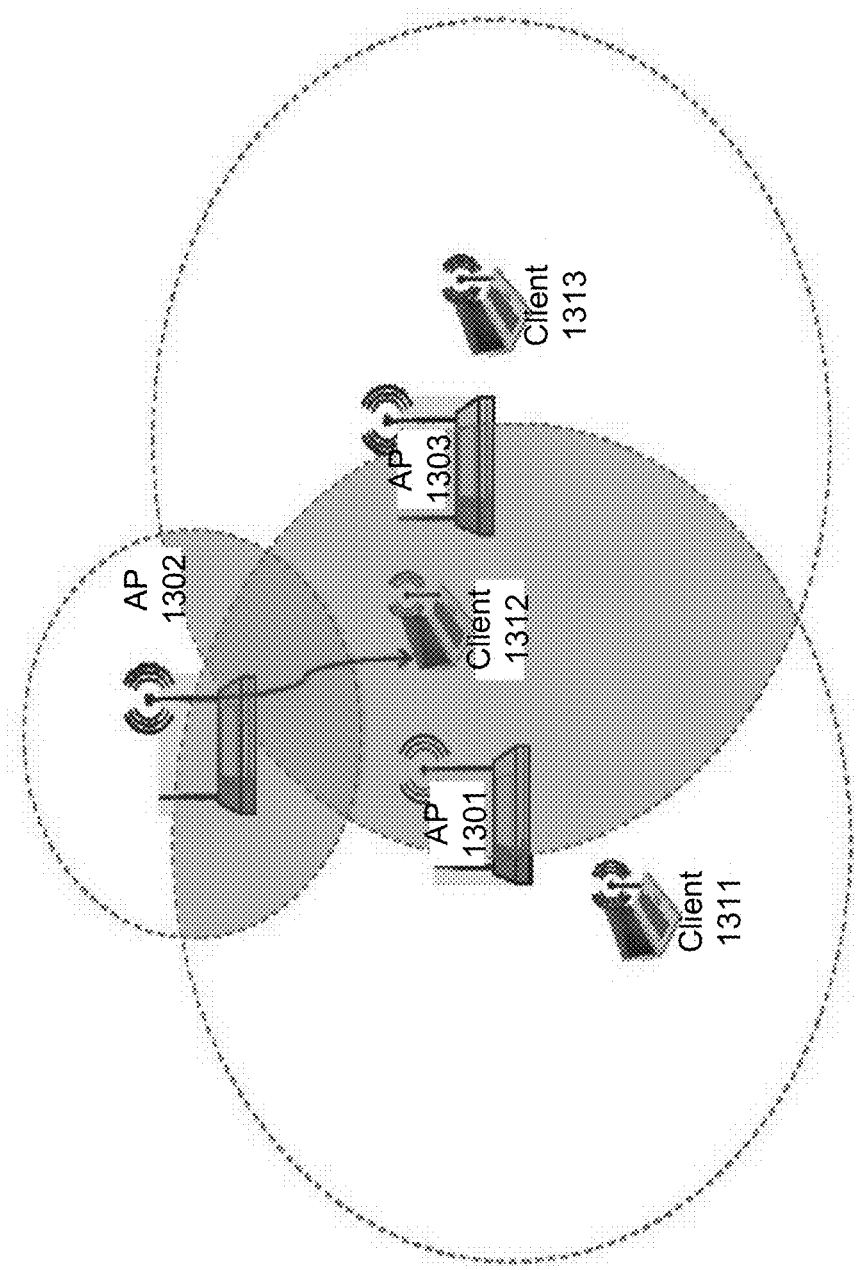
FIG. 14 illustrates that AP 1302 is configured with a high CST, while AP 1301 and 1303 are configured with low CST values.

FIG. 13 and FIG. 14 illustrate the high and low reuse periods of APs assigned to the same channel. FIG. 13 shows time intervals in which AP 1302 is configured with a low CST while AP 1301 and AP 1303 are configured with high CST values. During such intervals, AP 1302 remains silent, whereas AP 1301 and AP 1303 transmit to client 1311 and client 1313 simultaneously. This ensures that the network obtains high frequency reuse (increased overall throughput) without outages over individual links.

While the CST settings of FIG. 13 provide aggressive reuse for AP 1301 and AP 1303, AP 1302 is precluded from transmitting. Thus, during other time intervals, as shown in FIG. 14, the dynamic CST would configure AP 1302 with a high CST, while AP 1301 and AP 1303 are configured with low CST values. During such intervals, when AP 1302 transmits to client 1312, AP 1301 and AP 1303 backs off from transmitting (upon sensing AP 902's transmissions), thereby ensuring client 1312 is protected from the potential interference. This ensures that the network can guarantee that all clients obtain satisfactory user experience. This dynamic CST optimization scheme may be coupled with dynamic channel assignment (discussed earlier) to jointly optimize the channel allocation and frequency reuse for each channel. This dynamic CST optimization scheme may be coupled with dynamic channel allocation (discussed earlier) to jointly optimize channel allocation and transmit power for each channel. Dynamic CST, power control, and channel allocation may also be jointly optimized.

In some embodiments, cloud management system 702 dynamically optimizes the MIMO parameters of the APs. By introducing standards-based support for multiple antennas, the 802.11n and 802.11ac standards provide additional spatial dimensions for optimization. This flexibility allows for higher data rates and improved link reliability within the same bandwidth. In particular, compared to single antenna transmission/reception, MIMO schemes provide a three-fold advantage in terms of increased data throughput (spatial multiplexing), increased link reliability (transmit diversity), and array gain (spatial beamforming).

The 802.11n and 802.11ac standards support up to 4 and 8 transmit and receive antennas, respectively, with an equal number of maximum spatial streams. The 802.11n/ac standards provide support for achieving the aforementioned advantages via spatial precoding and beamforming schemes. The peak rate achieved in 802.11n is 600 Mbps while that in 802.11ac is more than 1 Gbps. In addition, the 802.11ac standard supports Multi-User MIMO (MU-MIMO), wherein multiple clients, each equipped with one or more antennas, can simultaneously transmit/receive within the same frequency channel.

In some embodiments, cloud management system 702 optimizes MIMO transmission parameters as follows:

1. Transmission Selection between Spatial Multiplexing and Diversity: There is a tradeoff between maximizing the data rate (via transmitting multiple spatial streams) and providing adequate link reliability in the presence of fading and multipath propagation (via diversity) for each spatial stream. This paradigm is referred to as the Diversity-Multiplexing (DM) tradeoff. In some embodiments, cloud management system 702 optimizes the transmission scheme, by exploiting the DM tradeoff, depending on the radio link conditions between each AP to its client.

2. Beamforming: Beamforming at the AP provides increased signal-to-noise ratio (SNR) at a client; alternatively, given knowledge of the channel statistics, the solution can minimize interference to clients connected to neighboring APs on the same channel.

3. Switching between Single-User and Multi-User MIMO: In high geometry and sufficiently uncorrelated scenarios, the solution will enable APs to spatially precode and transmit to multiple clients, provided their spatial signatures are sufficiently resolvable at the client.

Cloud management system 702 utilizes measurements performed by the APs to measure the channels to its clients as well as clients associated with neighboring APs operating on the same frequencies. The channels are estimated on the basis of sounding packets transmitted by clients. The measurements are fed back to Wi-Fi network manager, which optimizes the MIMO parameters at the APs via standardized interfaces, as discussed above.

In some embodiments, cloud management system 702 dynamically adapts the load balancing of the APs. Load balancing dynamically updates the association of clients based on the loads at different APs. For example, if an AP is highly loaded, cloud management system 702 can avoid overloading this AP by a client on the boundary of the AP's coverage area to connect to a neighboring AP with a low load, even if the channel quality of the client to the neighboring AP is not as good. This load balancing can result in performance improvement for this client, as well as the other clients connected to the original AP. After offloading a client from one AP to a less-loaded AP, cloud management system 302 then re-optimizes the channel allocations and transmit powers of the affected APs to account for this change in load.

In some embodiments, cloud management system 702 dynamically coordinates the scheduling of the APs. Cloud management system 702 enables a backhaul-coordinated scheduling whereby the APs managed by the network manager access the medium in a contention-free manner by transmitting beacon frames and a NAV-based reservation (within the beacon frames) of the medium. This notion of centralized scheduling and beacon-based access is akin to the concept of almost-blank subframes discussed earlier. Within the contention-free period, the resource allocation (e.g., the number of transmission opportunities at individual APs) within the contention-free period can be determined by cloud management system 702 based on different parameters, such as, for example, the queue lengths of different traffic classes at individual APs. Between time intervals with contention-free access, the dynamic configuration technique will implement periods of contention-based access in order to ensure that APs that are not managed by cloud management system 702 can access the medium.

In some embodiments, cloud management system 702 enables Cross-Layer Optimization for Adaptive Video Streaming. One of the key challenges in adaptive video streaming over HTTP over TCP is to adapt the video quality to the end-to-end bandwidth available between the server and the client. If a Wi-Fi network is used as the last hop to deliver streaming video to the client, the bandwidth is often limited by the wireless bandwidth available between the client and the AP it connects to. In some embodiments, application programming interfaces (APIs) are used between the media access control (MAC) layer and the application layer to achieve the following:

1. Estimates of data rates that can be offered in the future, for example on a timescale of tens of seconds, can be provided to the application layer. This can help the application layer better adapt the video quality. Current solutions can be either too aggressive or too slow to react to bandwidth variation.

2. Admission control and rate guarantees may be performed for the different video streaming flows so that the desired quality of video can be viewed by the users. User differentiation can also be provided.

In some embodiments, cloud management system 702 enables seamless Handoffs. In Wi-Fi networks, APs with the same SSID are called an Extended Service Set—clients transparently connect to any AP in this set without differentiation. Cloud management system 702 configures the Extended Service Set (ESS) for APs within a hotspot to ensure client mobility within the service area. Existing management interfaces are used to configure APs in this set, without requiring changes to the AP's software.

Advanced handoff functionality may be supported when a software agent is integrated with the APs. Inter-AP coordination for seamless handoffs within an ESS can be provided. The software agent adds Proxy Mobile IP functionality to the AP, enabling client handover across ESSs. This is a network-initiated procedure and there is no dependency on the client.

Figure 15:
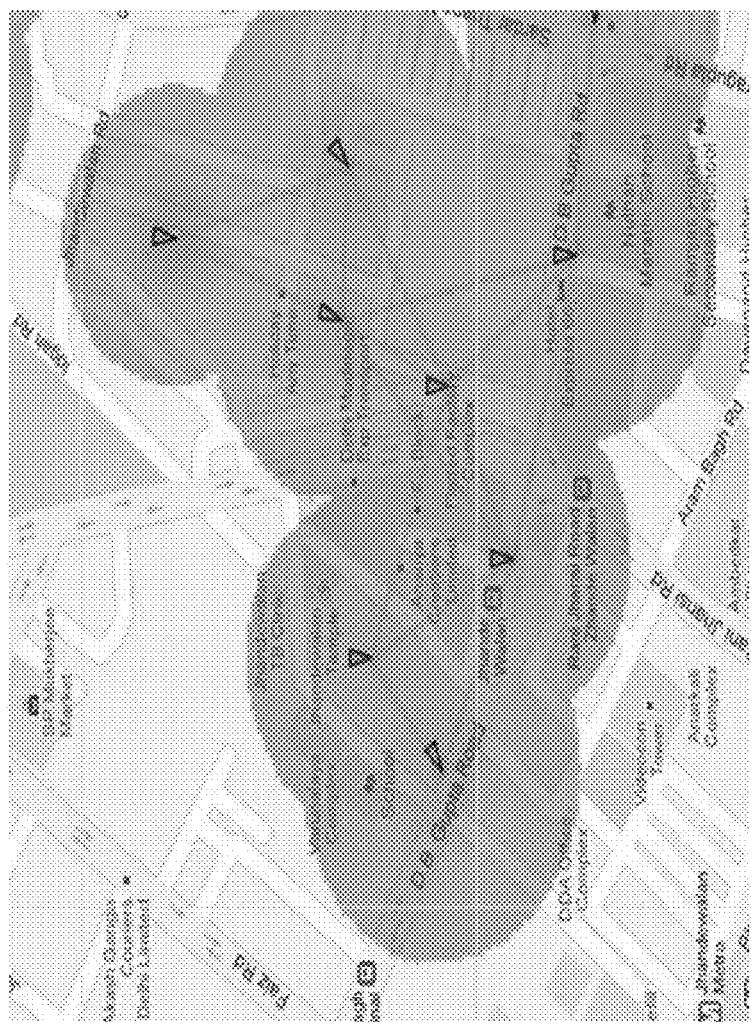
FIG. 15 illustrates an embodiment of a coverage map.

In some embodiments, cloud management system 702 provides coverage maps. Note that all APs (as well as clients) constantly monitor the wireless medium and attempt to decode all ongoing transmissions. As part of the decoding process, channel estimation is performed and thus the total received power from the transmitter of the ongoing transmission is determined. Thus, an AP will typically measure the RSSI from all APs and their clients operating on the same channel, as long as the packets transmitted by them can be received at sufficient received power. By cycling through different channels periodically, the AP can measure the channel gains to neighboring APs and their clients on all channels. This information, along with channel propagation models and client location information—determined by GPS if available, or estimated via intersections of location contours based on time-difference of arrival, angle-of-arrival, or connection-trajectory estimates—are used by cloud management system 702 to create SINR measurements at all client locations and the associated throughput and coverage maps, as illustrated in FIGS. 10 and 15.

As a second illustrative example of process 800, dynamic configuration of cellular networks is discussed next. In cellular networks, the increasingly limited availability of licensed cellular spectrum has motivated a change in cellular network architecture, from flat to hierarchical. Most 2G and 3G cellular network architectures were flat, consisting mainly of macrocells transmitting at 10-40 W of power. While such large cells are beneficial for fast deployment and wide area coverage, they do not provide high capacity due to their non-aggressive frequency reuse. Smaller cells, such as microcells, picocells and femtocells, transmit at much lower powers (0.01-10 W) and hence have smaller coverage areas. As a result, they can devote their full resources to a smaller number of users, and hence have much higher capacity than macrocells. The high capacity of small cells has led to a hierarchical cellular architecture, wherein large cells are deployed for coverage, while smaller cells are deployed for capacity. Since small cells are generally much cheaper than large cells, their cost per Mbit is generally much lower. However, the deployment challenges of small cells have precluded their widespread adoption to date. In particular, there are currently about 3 million macrocells in place worldwide today, each of which typically deployed by a team of skilled personnel spending about 7.5 man days to carefully plan and configure the macrocell base station parameters. The cost and time to configure small cells in a similar manner is prohibitive. Hence, an automated solution for self-configuring the small cells is needed.

Cloud-based RRM algorithms provide such a solution. Process 800 may be used to configure and update parameters in one or more cellular networks to optimize the overall network performance. The RRM algorithm dynamically optimizes the parameters of each small cell LTE base stations (eNodeBs) under its control, including channel allocation, fractional frequency reuse, transmit power, and range extension bias. The RRM algorithm can also optimize an eNodeB's response to inter-channel interference coordination (ICIC) messages it receives over the standards-based X2 interface. The objective of the RRM algorithm is to centrally optimize the overall network performance by minimizing interference, maximizing throughput, maximizing coverage, and ensuring robustness and self-healing. The RRM algorithm can also impose operator-driven constraints such as minimum throughput per user or bounded interference to the HetNet macrocells. Energy-consumption minimization, potentially based on load, can also be incorporated into the algorithm.

Because cloud management system 200 collects measurements and other information from the heterogeneous wireless devices in various types of wireless networks, cloud management system 200 may optimize the parameters of a heterogeneous wireless device located on one type of wireless network based on measurement data collected from another heterogeneous wireless device located on another type of wireless network or based on information related to another type of wireless network, wherein each type of network uses a different type of radio access technology (e.g., Wi-Fi, 2G, 3G, 4G LTE, millimeter wave technology, and cognitive radio). For example, referring back to step 806 of process 800, cloud management system 200 may collect measurement data from Wi-Fi APs, Wi-Fi APs, small cell LTE eNodeBs, 2G (second-generation wireless telephone technology) and 3G (third generation of mobile telecommunications technology) cellular base stations, dual-mode Wi-Fi/cellular devices, millimeter wave devices, cognitive radio devices, and other wireless terminals operating in the licensed and/or unlicensed spectral bands. At step 808 of process 800, optimized adjustments to Wi-Fi parameters associated with a particular Wi-Fi AP or a group of Wi-Fi APs may be searched based on measurement data associated with Wi-Fi and other radio access technologies (e.g., 2G, 3G, 4G LTE, millimeter wave technology, and cognitive radio).

Cloud management system 200 may also configure the heterogeneous wireless devices to enable roaming within a given network. For Wi-Fi networks, the 802.11 standard allows seamless roaming of clients between all APs with the same SSID, which is a parameter configurable by cloud management system 200. In addition, a given AP may be configured with multiple SSIDs, allowing both private SSIDs for a private set of client devices and public SSIDs to enable roaming for all client devices authenticated for such roaming services. Hence, AP configuration by cloud management system 200 allows for global SSIDs, whereby all APs registered with the cloud management system can be used by a client authenticated for roaming between all cloud-managed APs.

Cloud management system 200 also allows for network-initiated seamless handoffs between different types of networks that use different types of radio access technologies. Since cloud management system 200 has access to information and measurement data across many different types of networks, cloud management system 200 may optimize the overall network performance by initiating the handoff of a client device from one network to another. For example, cloud management system 200 may initiate a seamless handoff between an LTE cellular network and an 802.11 Wi-Fi network. In another example, cloud management system 200 may initiate a seamless handoff between an LTE cellular network and a cognitive radio network. In some embodiments, cloud management system 200 determines that a handoff should be performed, then directs the related heterogeneous wireless device to do so. In some embodiments, cloud management system 200 may selectively send certain information or measurement data collected by cloud management system 200 to a heterogeneous wireless device to allow the heterogeneous wireless device to decide whether to handoff a client device to another network or not. In some embodiments, cloud management system 200 may selectively send certain information or measurement data collected by cloud management system 200 to a client device to allow the client device to decide whether to handoff to another network or not.

For LTE-Wi-Fi handoff to a stand-alone Wi-Fi AP, a software agent on the AP is used. This agent requests the public IP address of the user equipment (UE) from the LTE operator's core network and then tunnels packets to the UE from Wi-Fi via the mobile IP protocol, as will be described in greater detail below. For dual-model Wi-Fi/small-cell devices, a simultaneous connection to the UE through both the Wi-Fi and LTE network is maintained. This allows for simultaneous access to LTE and Wi-Fi network services, minimal overhead when the UE switches between the LTE and Wi-Fi networks, as well as intelligent handoff between the two networks based on network conditions, Quality-of-Service (QoS), load balancing, and UE velocity.

Figure 16:
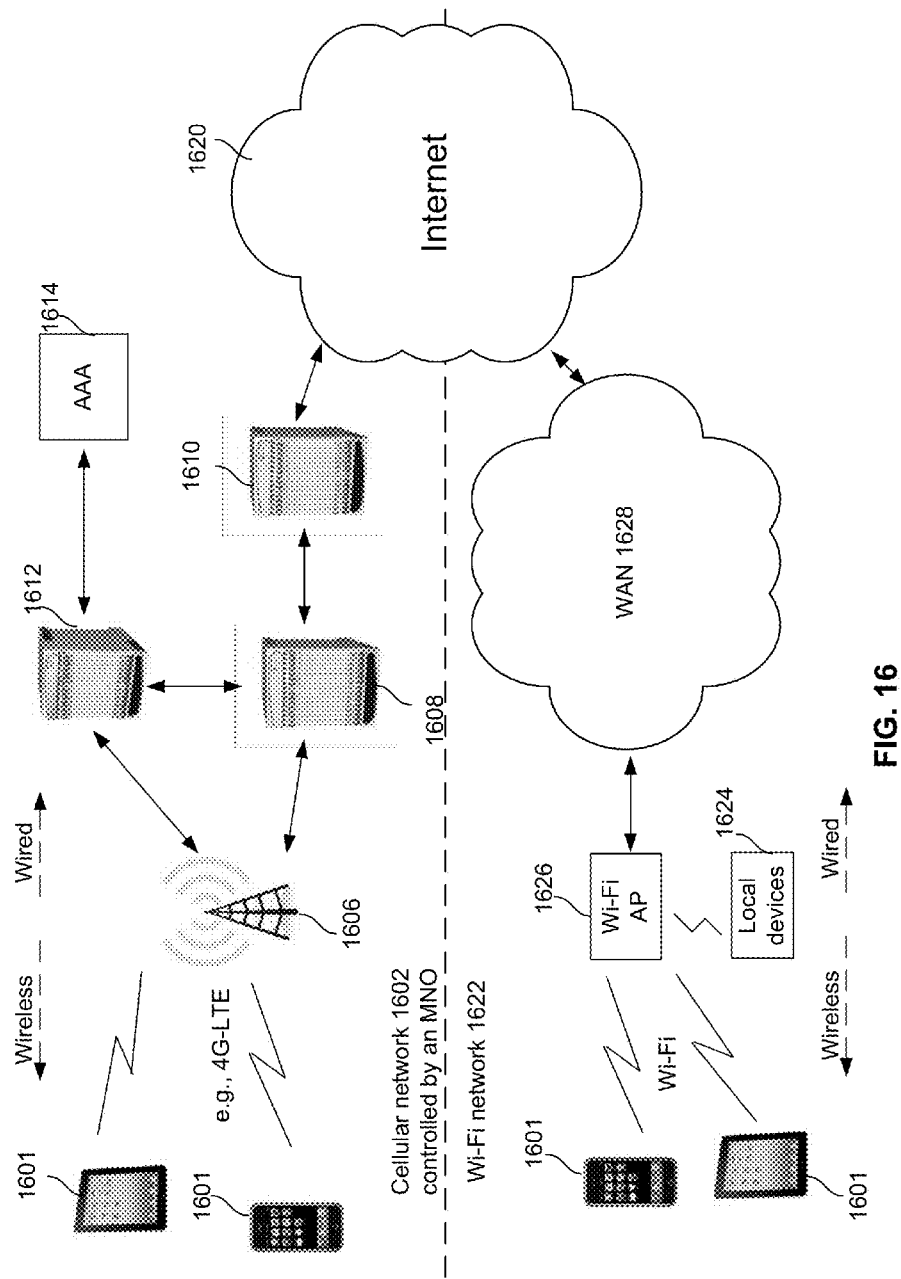
FIG. 16 is an exemplary block diagram illustrating a plurality of user equipment terminals (UEs) 1601 establishing connections to the Internet (1620) via either a cellular network 1602 or a Wi-Fi network 1622.

As an illustrative example, handoff from LTE to a stand-alone Wi-Fi AP is discussed next. FIG. 16 is an exemplary block diagram illustrating a plurality of user equipment terminals (UEs) 1601 establishing connections to the Internet (1620) via either a cellular network 1602 or a Wi-Fi network 1622. An UE 1601 may be any client device used by an end-user to communicate, including a smartphone, a laptop computer or a tablet equipped with mobile broadband adapters, and the like.

The upper portion of FIG. 16 illustrates an embodiment of a cellular network 1602 that is operated by a mobile network operator (MNO), e.g., Verizon Wireless or T-Mobile USA. An MNO is a provider of wireless communications services that owns or controls the elements to deliver services to an end-user, including radio spectrum allocation, wireless network infrastructure, back haul infrastructure, billing, customer care, and the like. Cellular network 1602 provides UEs 1601 with connectivity to other UEs and to different services and devices on the Internet 1620.

Cellular network 1602 may be any IP-based cellular network, such as a 4G LTE network, a WiMAX network, and the like. UEs 1601 obtain services from cellular network 1602 by communicating wirelessly with a base station 1606, e.g., an eNodeB in a 4G LTE network. Base station 1606 in turn communicates with other elements in cellular network 1602. For example, elements in cellular network 1602 include, but are not limited to, a radio-IP gateway 1608, a cellular network gateway 1610, a mobility management device 1612, an authentication, authorization, and accounting (AAA) server 1614, and a cellular network dynamic host configuration protocol (DHCP) server. AAA server 1614 is a server that authenticates and authorizes a mobile user, and also provides accounting features to a billing server. A DHCP server is a server that allocates an IP address to a client. Cellular network gateway 1610 is a gateway for routing and address allocation.

The lower portion of FIG. 16 illustrates an embodiment of a Wi-Fi network 1622 which is connected to the Internet (1620) via a wide area network (WAN) 1628. A Wi-Fi network 1622 may operate in a variety of settings, including a residential setting as a home Wi-Fi network, a commercial/retail setting as a Wi-Fi hotspot, or a business/office setting as an enterprise Wi-Fi network. In some embodiments, Wi-Fi network 1622 is a wireless local area network (WLAN) operating in infrastructure mode. In infrastructure mode, a plurality of UEs 1601 and a plurality of local devices 1624 communicate with a Wi-Fi access point (Wi-Fi AP) 1626 in a hub-and-spoke topology. Local devices 1624 are devices that provide local services. In some embodiments, local devices 1624 include local printers, copiers, scanners, cameras, storage media, fax machines, and the like.

In some embodiments, Wi-Fi AP 1626 may be connected (either directly, or indirectly via a layer 2 switch or a layer 3 router) to WAN 1628, which provides connectivity to the Internet (1620). WAN 1628 may be any backhaul connection to the Internet (1620). For example, WAN 1628 may include a digital subscriber line (DSL) modem, which provides Internet connectivity over the local telephone network. In another example, WAN 1628 may include a cable modem, which provides Internet connectivity via a hybrid fiber-coaxial (HFC) network. In some embodiments, Wi-Fi AP 1626 may be integrated with a cable modem, and the integrated unit may send traffic to a cable modem termination system (CMTS) via a hybrid fiber-coaxial (HFC) network. Wi-Fi AP 1626 is a heterogeneous wireless device that is managed and controlled by cloud management system 200.

Figure 17:
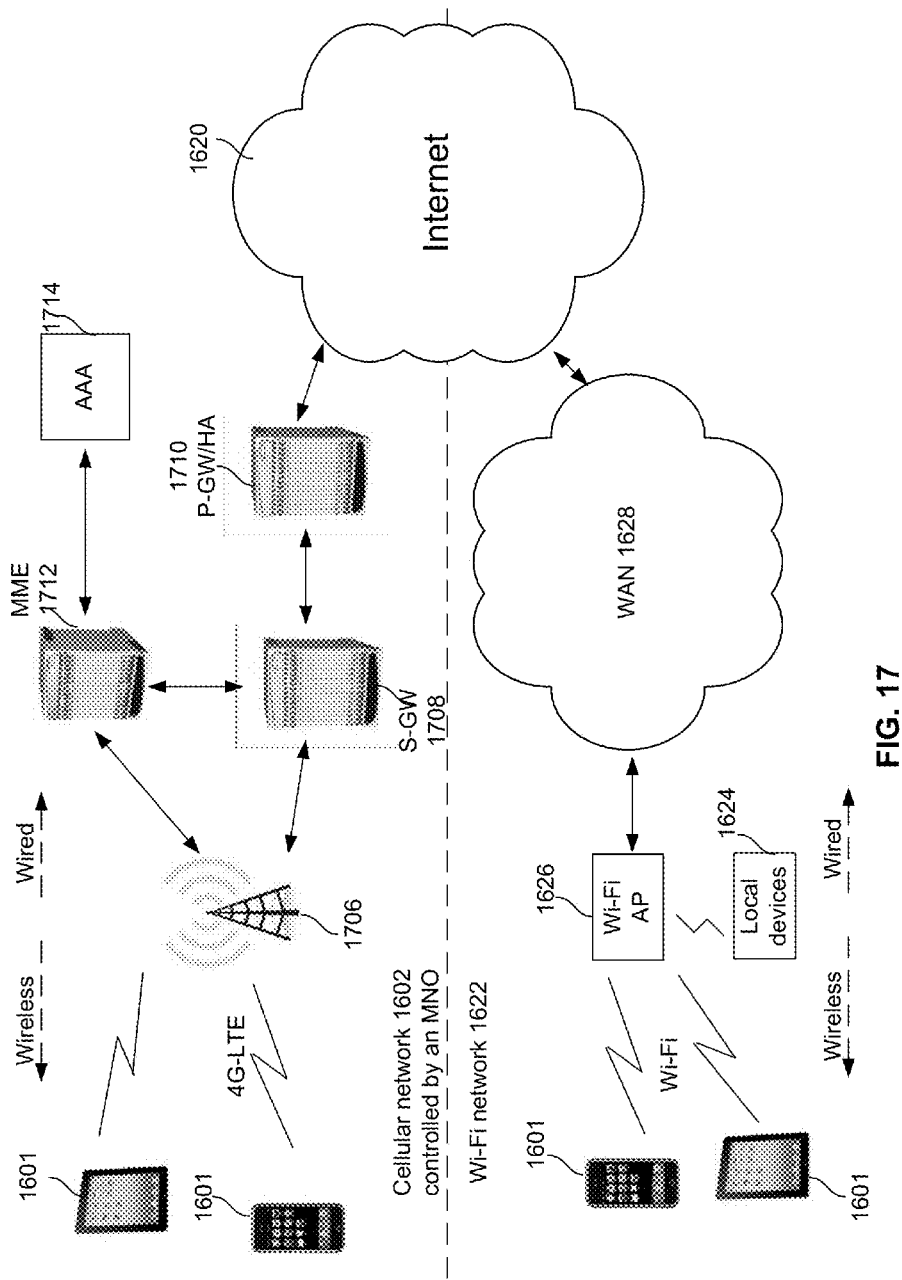
FIG. 17 is an exemplary block diagram illustrating a plurality of user equipment terminals (UEs) 1601 establishing connections to the Internet (1620) via either a cellular network 1602 or a Wi-Fi network 1622.

FIG. 17 is an exemplary block diagram illustrating a plurality of user equipment terminals (UEs) 1601 establishing connections to the Internet (1620) via either a cellular network 1602 or a Wi-Fi network 1622. FIG. 17 is similar to FIG. 16, except that cellular network 1602 is shown as a generic IP-based cellular network in FIG. 16, whereas cellular network 1602 is shown as a 4G LTE network in FIG. 17. For example, radio-IP gateway 1608, cellular network gateway 1610, and mobility management device 1612 are replaced by a serving gateway (S-GW) 1708, a packet gateway (P-GW) 1710 or home agent 1710, and a mobility management entity (MME) 1712, respectively. Home agent 1710 is a device that acts as an anchor point for all data communications for mobile nodes; for example, mobile nodes can move to different locations and still be able to access services through home agent 1710.

Figure 18:
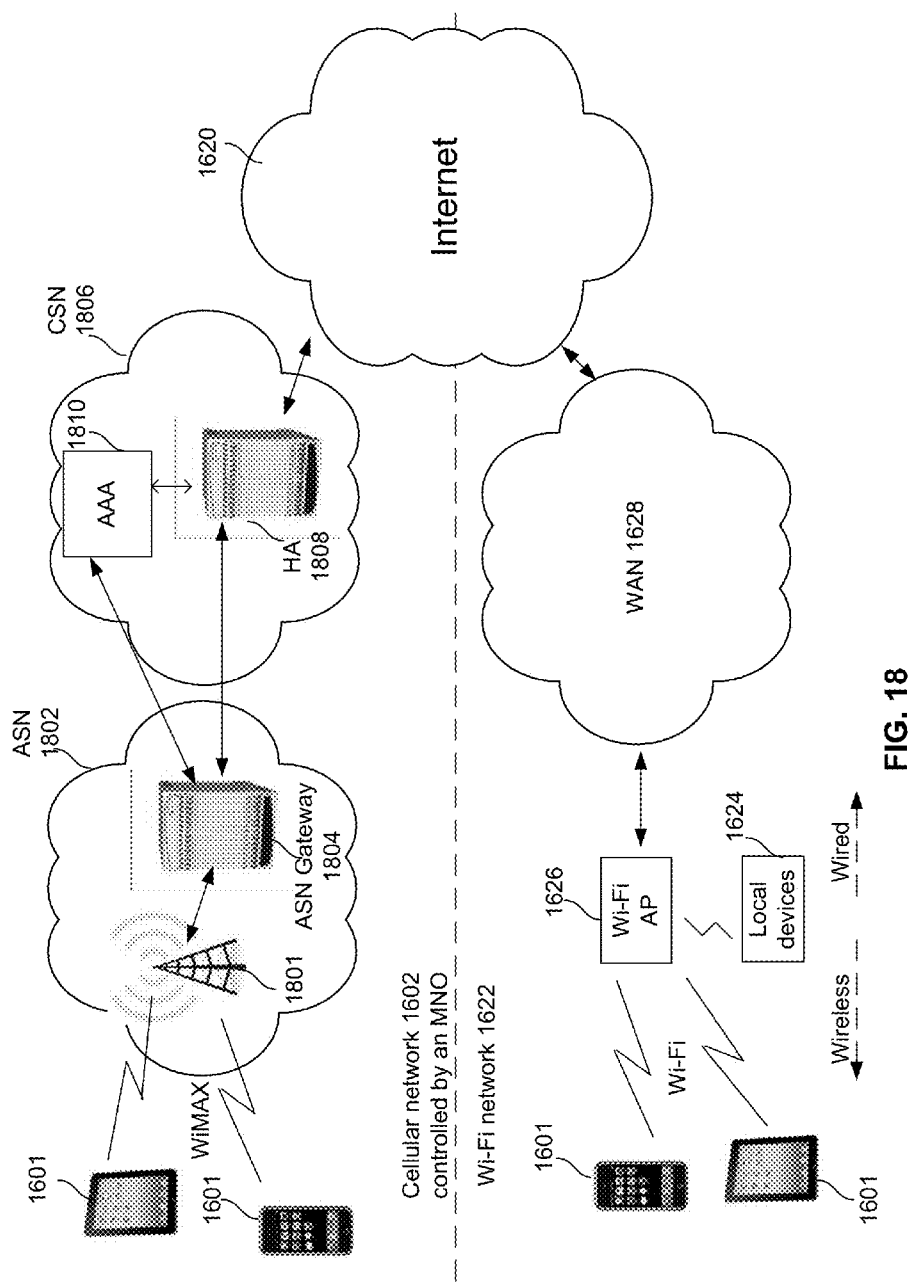
FIG. 18 is another exemplary block diagram illustrating a plurality of user equipment terminals (UEs) 1601 establishing connections to the Internet (1620), via either a cellular network 1602 or a Wi-Fi network 1622.

FIG. 18 is another exemplary block diagram illustrating a plurality of user equipment terminals (UEs) 1601 establishing connections to the Internet (1620), via either a cellular network 1602 or a Wi-Fi network 1622. In FIG. 18, cellular network 1602 is shown as a WiMAX network. UEs 1601 obtain services from cellular network 1602 by communicating wirelessly with a base station 1801 within an access service network (ASN) 1802. Base station 1801 in turn communicates with other elements in ASN 1802, including an ASN gateway 1804. ASN gateway 1804 connects ASN 1802 with a connectivity service network (CSN) 1806, which provides connectivity to the Internet (1620). Elements in CSN 1806 include, but are not limited to, a home agent 1808 and an AAA server 1810.

Note that the techniques disclosed in the present application are applicable to any IP-based cellular network standard, including the 4G LTE network as shown in FIG. 17 and the WiMAX network as shown in FIG. 18. Therefore, even though the techniques may be disclosed using terminologies corresponding to a particular type of network/standard, the techniques disclosed in the present application should not be limited to one type of network/standard only.

Figure 19:
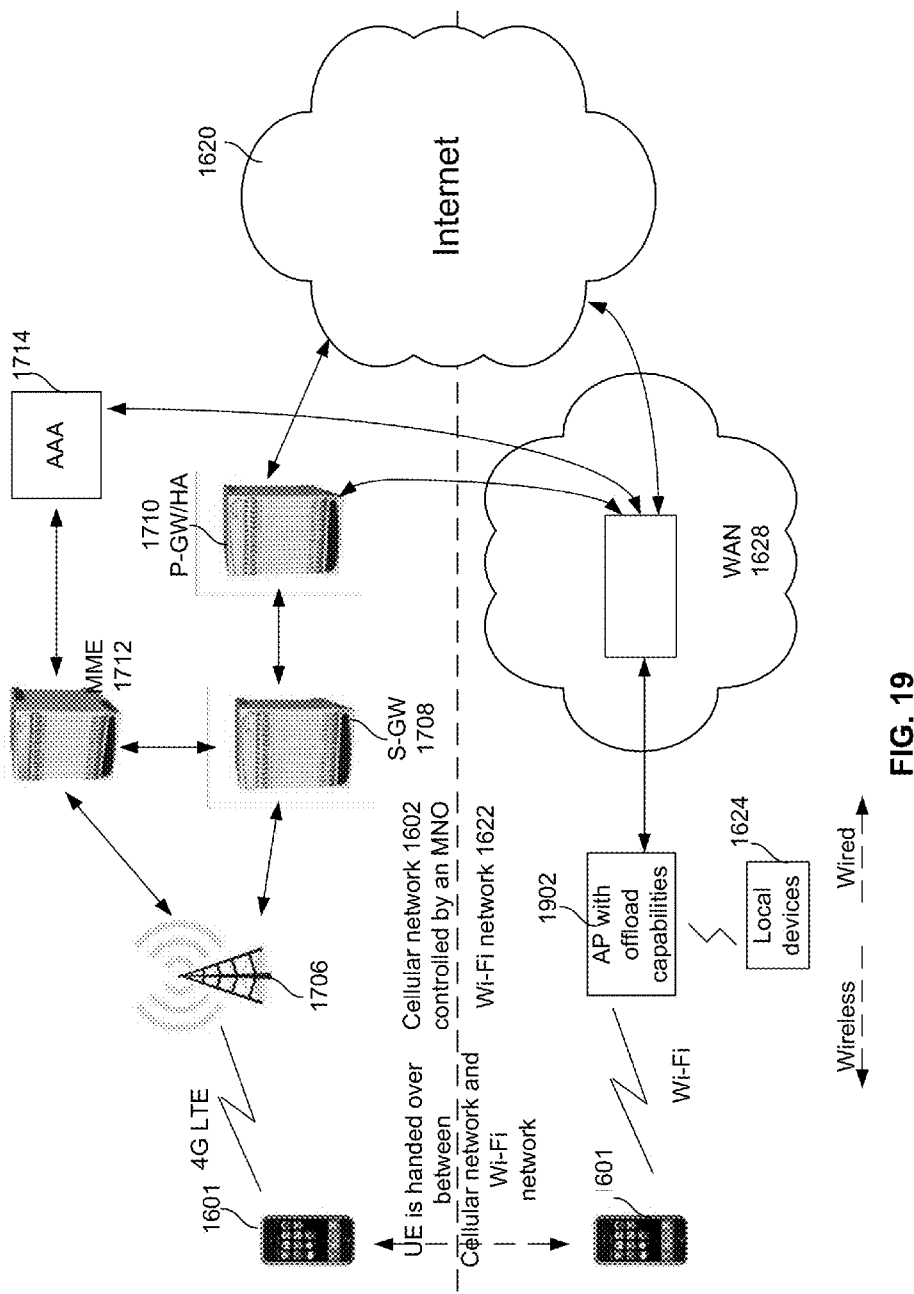
FIG. 19 is a block diagram illustrating an embodiment of a system for seamless handover and data offloading between a cellular network and a Wi-Fi network.

FIG. 19 is a block diagram illustrating an embodiment of a system for seamless handover and data offloading between a cellular network and a Wi-Fi network. As shown in FIG. 19, a UE 1601 can be handed over between cellular network 1602 and Wi-Fi network 1622. The handover and data offloading is controlled by an AP 1902 with offloading capabilities. The criteria for handover and data offloading are determined by AP 1902 based on information and measurement data regarding the cellular network and the Wi-Fi network sent to AP 1902 by cloud management system 200. In some embodiments, the criteria for handover and data offloading are determined by cloud management system 200. In some embodiments, no special client software is required on UE 1601 for the handover and data offloading disclosed in the present application to work, because no action or coordination with the UE is required. As will be described in greater detail below, existing sessions established on cellular network 1602 may be preserved during data offloading by using mobile IP tunneling, thus avoiding interruptions to any applications, e.g., streaming video, VoIP call, and VPN access, that are already running on UE 1601.

Figure 20:
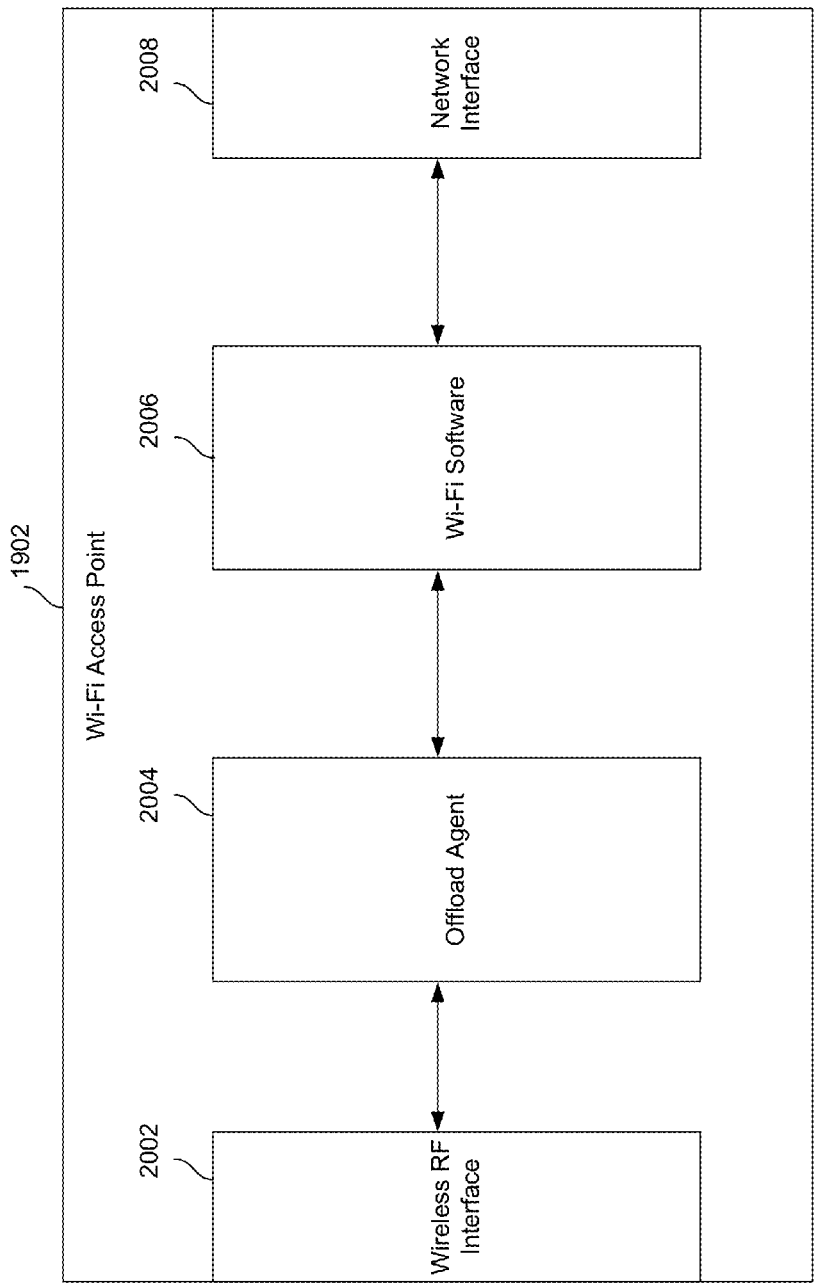
FIG. 20 is a block diagram illustrating an embodiment of a Wi-Fi access point for seamless handover and data offloading between a cellular network and a Wi-Fi network.

FIG. 20 is a block diagram illustrating an embodiment of a Wi-Fi access point for seamless handover and data offloading between a cellular network and a Wi-Fi network. In some embodiments, the Wi-Fi access point in FIG. 20 is AP 1902 as shown in FIG. 19. Seamless handover and data offloading are controlled by an offload agent 2004. For example, as shown in FIG. 20, offload agent 2004 may be implemented as a middleware between a wireless RF interface 2002 and a Wi-Fi protocol software 2006. Offload agent 2004 performs processing on both the control path and the data path.

In some embodiments, AP 1902 determines when and whether to handoff and offload data between cellular networks and Wi-Fi networks. The determination is based on information and measurement data sent to AP 1902 by cloud management system 200. In some embodiments, cloud management system 200 determines when and whether to handoff and offload data and directs AP 1902 to do so. A handoff from the cellular network to the Wi-Fi network or from the Wi-Fi network to the cellular network may be based on a set of criteria. The set of criteria may be based on any combination of network policies and characteristics, QoS requirements of the UE (such as whether the UE is a subscriber with premium services or standard services), the type of application (e.g., video versus HTTP traffic), network performance, load-balancing metrics, and the like. Network policies may include the policy of the mobile network operator (MNO), the policy of the Wi-Fi network backhaul provider (e.g., the DSL service provider or the cable network service provider), and/or the policy of the local network (e.g., the network access policy of an enterprise). Performance and load-balancing metrics may include the level of traffic congestion, the degree of latency, the throughput, or other metrics. The metrics may be monitored on the cellular network and the Wi-Fi network.

Criteria for handoff from a cellular network to a Wi-Fi network may include, but are not limited to, one or more of the following:

- All data sessions are handed off from the cellular network to the Wi-Fi network, whereas all voice sessions are maintained on the cellular network;
- All cellular traffic is handed off to the Wi-Fi network whenever the Wi-Fi network is detected;
- All cellular traffic is handed off to the Wi-Fi network when the quality of the cellular link falls below a given performance target;
- All high-priority data or data requiring a given QoS remain on the cellular network, and all other data are handed off to the Wi-Fi network;

The quality of a UE's cellular and Wi-Fi connections are monitored, and handoff from the cellular network to the Wi-Fi network occurs if the Wi-Fi network delivers better performance.

Criteria for handoff from a Wi-Fi network to a cellular network may include, but are not limited to, one or more of the following:

All voice sessions (e.g., Skype VoIP sessions) are handed off from the Wi-Fi network to the cellular network, whereas all data sessions are maintained on the Wi-Fi network.

All Wi-Fi traffic or Wi-Fi traffic requiring a given QoS are handed off to the cellular network when the quality of the Wi-Fi link falls below a given performance target.

All high-priority data or data requiring a given QoS are handed off to the cellular network, and all other data remain on the Wi-Fi network The quality of a UE's cellular and Wi-Fi connections are monitored, and handoff from the Wi-Fi network to the cellular network occurs if the cellular network delivers better performance.

Some UEs 1601 may be pre-programmed with a given network preference (e.g., pre-programmed to always use a Wi-Fi network when available). Under this situation, if the handoff criteria determine that the UE should use the cellular network for access, AP 1902 may block or deny any Wi-Fi network access by the UE 1601 to force the handoff from the Wi-Fi network to the cellular network. Alternatively, UEs 1601 may be enabled to set the network it connects to based on a control command, in which case the control command would be issued by AP 1902.

Figure 21:
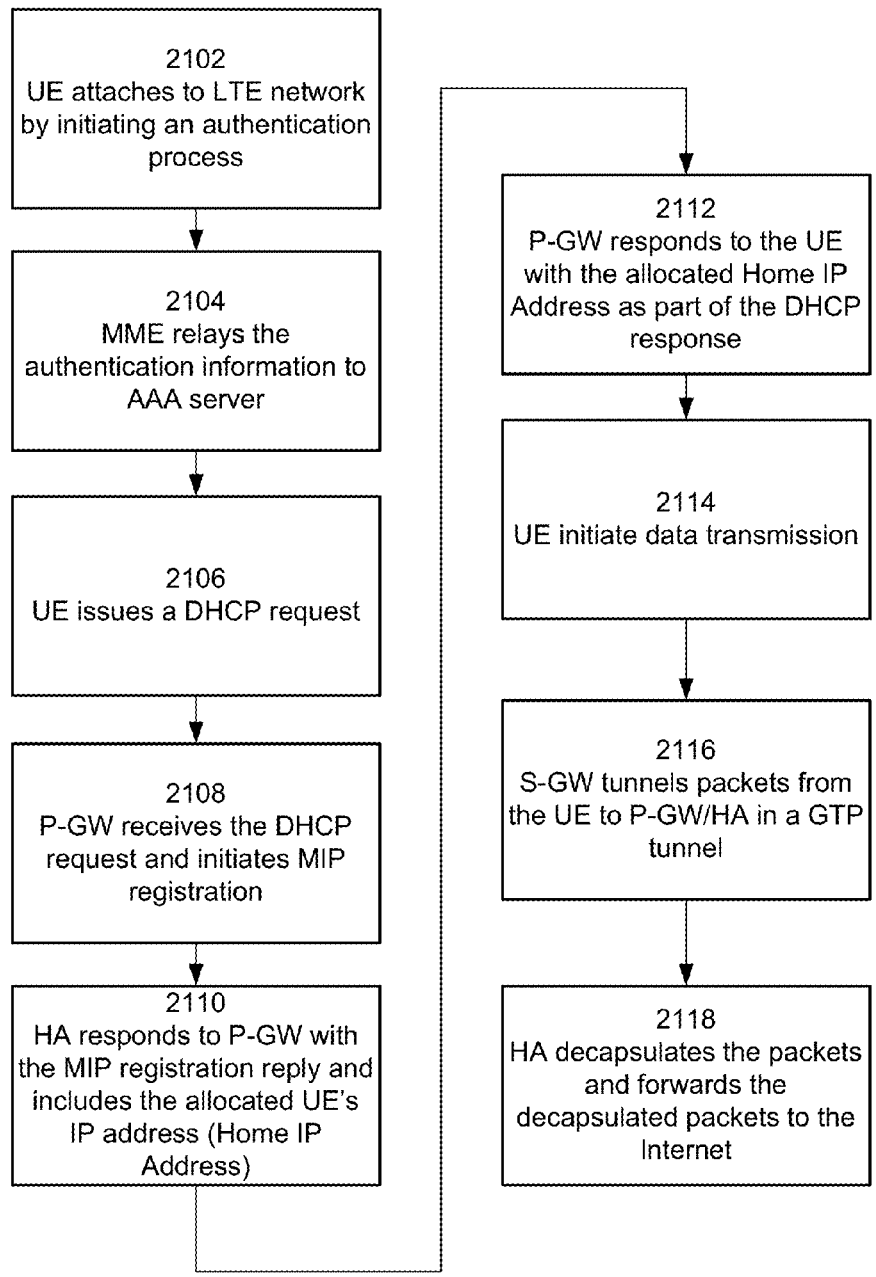
FIG. 21 is a flow chart illustrating an embodiment of a process 2100 for establishing a connection between an UE and a 4G-LTE cellular network, wherein the connection can be subsequently offloaded to a Wi-Fi network.

FIG. 21 is a flow chart illustrating an embodiment of a process 2100 for establishing a connection between an UE and a 4G-LTE cellular network, wherein the connection can be subsequently offloaded to a Wi-Fi network. Those of ordinary skill in the art will recognize that process 2100 may be used to establish a connection between an UE and any IP-based cellular network, including WiMAX, or other networks as well.

With reference to FIG. 19 and FIG. 21, UE 1601 attaches to an LTE cellular network by initiating an authentication process at 2102. At 2104, MME 1712 relays the authentication information to AAA server 1714, which authenticates UE 1601 and responds with the UE's provisioned parameters. If UE 1601 is configured as a mobile UE, then AAA server 1714 responds with the UE's Mobile IP (MIP) attributes, including the MN-HA keys, the FA-HA Keys, and the IP address of P-GW/HA 1710.

At 2106, UE 1601 issues a DHCP request in order to be allocated an IP address. At 2108, when P-GW/HA 1710 receives the DHCP request, it initiates a MIP registration. In particular, P-GW/HA 1710 acts as a PMIP client and sends a MIP registration request to its HA function.

At 2110, P-GW/HA 1710 function responds to P-GW/HA 1710 with the MIP registration reply and includes the allocated UE's IP address, hereinafter referred to as the Home IP Address. In particular, if a DHCP server is configured in P-GW/HA 1710, P-GW/HA 1710 requests the DHCP server to allocate an IP address for this UE 1601. Otherwise, P-GW/HA 1710 may allocate the IP address itself, based on local configuration.

At 2112, P-GW/HA 1710 responds to UE 1601 with the allocated Home IP Address as part of the DHCP response. At 2114, after acquiring the Home IP Address, UE 1601 may initiate data transmission. At 2116, S-GW 1708 tunnels packets from the UE 1601 to P-GW/HA 1710 in a general packet radio service tunneling protocol (GTP) tunnel. At 2118, upon receipt of a packet from the tunnel, P-GW/HA 1710 decapsulates the packet and forwards the decapsulated packet to the Internet 1620.

Figure 22:
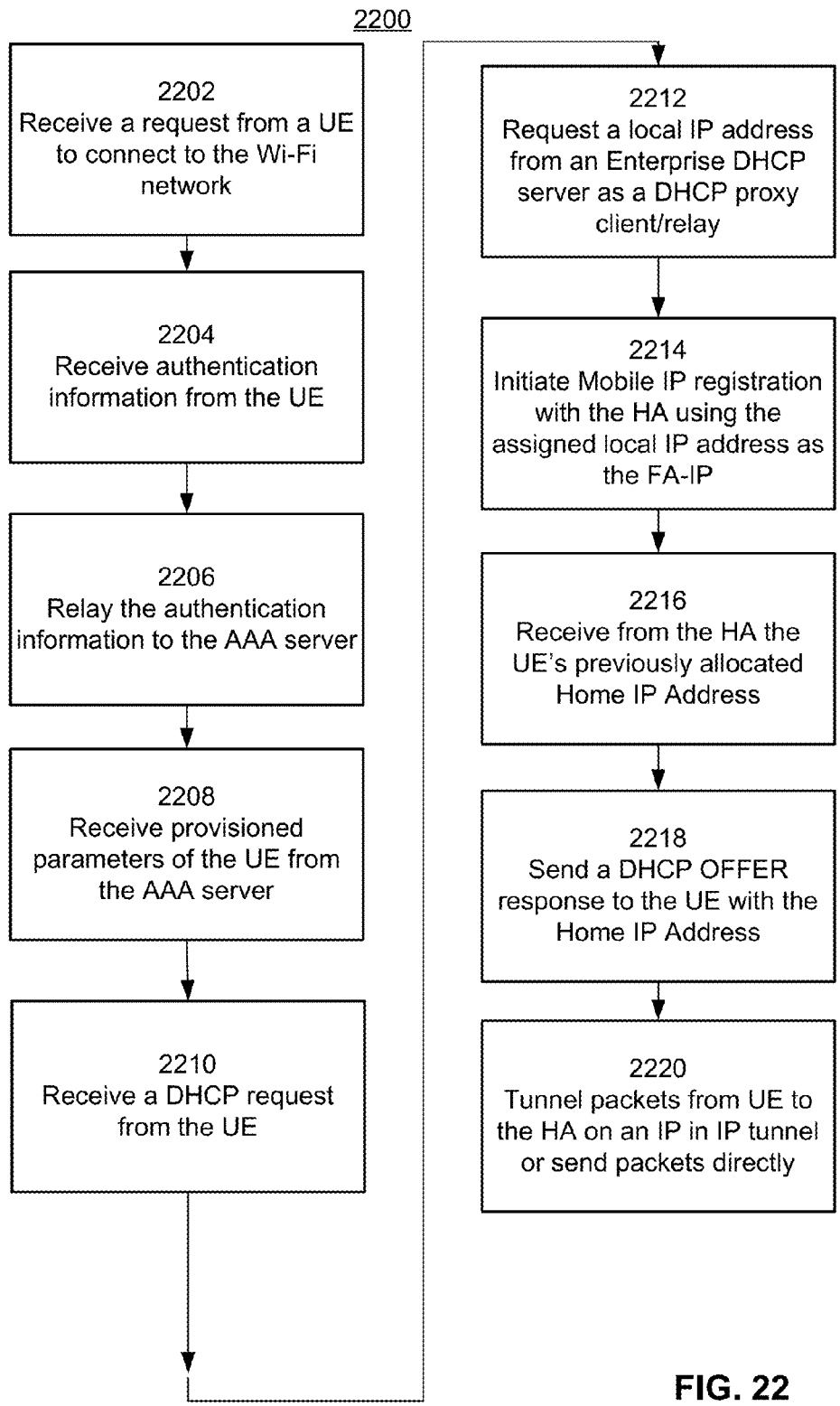
FIG. 22 is a flow chart illustrating an embodiment of a process 2200 for seamlessly offloading the data of an UE from a cellular network to a Wi-Fi network.

FIG. 22 is a flow chart illustrating an embodiment of a process 2200 for seamlessly offloading the data of an UE from a cellular network to a Wi-Fi network. In some embodiments, process 2200 is a process that is run on AP 1902 of FIG. 19. An LTE network and an enterprise Wi-Fi network are selected as illustrative examples for the cellular network and the Wi-Fi network, respectively; however, different combinations of cellular networks (e.g., WiMAX or LTE) and Wi-Fi networks (e.g., enterprise, hotspot, or residential) are possible.

With reference to FIG. 19 and FIG. 22, a request from a UE 1601 to connect to enterprise Wi-Fi network 1622 is received by AP 1902 at 2202. For example, when a UE 1601 that is already configured with the AP information of the enterprise Wi-Fi network (i.e., the Service Set Identifier, or SSID) moves within range of the Wi-Fi network, UE 1601 sends a request to AP 1902, requesting to be attached to AP 1902. In response, AP 1902 initiates an authentication process. At 2204, the authentication information sent by UE 1601 is received by AP 1902. Included in the authentication information may be the Network Access Identifier of the UE, from which AP 1902 can identify the MNO that the UE is associated with.

At 2206, the authentication information sent by UE 1601 is relayed by AP 1902 to the AAA server 1714 associated with the MNO. AAA server 1714 authenticates UE 1601 and responds with the provisioned parameters of the UE. At 2208, the provisioned parameters of UE 1601 are received by AP 1902, and AP 1902 is associated with the UE after the completion of authentication.

At 2210, a DHCP request issued by UE 1601 requesting for an IP address to be allocated to the UE is intercepted by AP 1902. At 2212, a DHCP request for a local IP address is sent by AP 1902 to a Wi-Fi network DHCP server, which may be collocated with AP 1902 or connected to it. In particular, AP 1902 sends the request to the Wi-Fi network DHCP server as a DHCP proxy client/relay. In response to the DHCP request sent by AP 1902, the DHCP server allocates a local IP address (hereinafter referred to as the Local IP Address) from its address pool, in the same manner as it would if a local Wi-Fi client (e.g., a printer) connecting to the AP 1902 had issued a DHCP request.

At 2214, mobile IP registration with P-GW/HA 1710 is initiated by AP 1902. AP 1902, acting as a proxy mobile IP (PMIP) client, initiates mobile IP registration with P-GW/HA 1710 using the assigned Local IP Address as the foreign agent IP address (FA-IP). At 2216, the UE's previously allocated Home IP Address is sent by P-GW/HA 1710 and received by AP 1902. At 2218, a DHCP OFFER message which includes the Home IP Address is sent by AP 1902 to the UE. UE 1601 may then initiate data transmission at this point. In particular, UE 1601 sends data packets with the source IP address set to Home IP Address.

At 2220, AP 1902 may determine whether IP in IP tunneling is needed. In the event that tunneling is needed, the UE's packets can be tunneled by AP 1902 to P-GW/HA 1710 on an IP in IP tunnel. The tunnel is created with the source IP address set to Local IP Address and the destination IP address set to the HA IP address. Upon receipt of a packet from the tunnel, P-GW/HA 1710 decapsulates the packet and forwards the decapsulated packet to the Internet 1620. In the event that tunneling is not needed, the UE's packets are sent directly to the Internet without going through a tunnel.

Handoff of a UE between a cellular network and a Wi-Fi network may occur at one or more instances during a connection with a UE. A handoff of the UE from the cellular network to a Wi-Fi network may occur when the UE initially comes within range of, and attempts to connect with, a Wi-Fi network, as described in process 2200. Some UEs 1601 may be pre-programmed with a given network preference (e.g., pre-programmed to always use a Wi-Fi network when available). However, it is the offload agent, acting together with the AP (or the cloud management system 200), which decides whether the handoff to the Wi-Fi network should occur. If the handoff criteria determine that the UE should use the cellular network for access, AP 1902 may block any Wi-Fi network access by the UE 1601 to force the UE to continue using the cellular network. Alternatively, UEs 1601 may be enabled to set the network it connects to based on a control command, in which case the control command would be issued by AP 1902. After a connection to the Wi-Fi network is established, AP 1902 may subsequently force a handoff of the UE from the Wi-Fi network to the cellular network, and then from the cellular network back to Wi-Fi network, in accordance with handoff criteria previously discussed.

Cloud management system 200 also allows for sending a message or a data stream through multiple pathways, including pathways that traverse different types of wireless networks, using linear network coding or multiple description coding techniques.

Linear network coding is a technique that can be used to improve a network's throughput, efficiency, and scalability, as well as resilience to attacks and eavesdropping. Linear network coding involves breaking a message into chunks, deriving information about those chunks, and then sending that meta information down multiple pathways in such a way that the original message can be reconstructed at the recipient's end even if some of the chunks are lost. One aspect of network coding involves deciding how many paths to send a message through. Increasing the number of paths decreases the impact of any single path failure, although it increases the number of devices in involved in a single call. This strategy spreads the load of the call across more participants, decreasing the power burden for each while increasing the amount of coordination required. Since cloud management system 200 has access to information and measurement data across many different types of networks, cloud management system 200 may determine the pathways for linear network coding while optimizing overall network performance.

Multiple description coding (MDC) is a coding technique that fragments a single media stream into n substreams (n>=2), referred to as descriptions. The packets of each description are routed over multiple, (partially) disjoint paths. In order to decode the media stream, any description can be used. However, the quality improves with the number of descriptions received in parallel. MDC provides error resilience in media streams. Since an arbitrary subset of descriptions can be used to decode the original stream, network congestion or packet loss will not interrupt the stream but only cause a temporary loss of quality. As cloud management system 200 has access to information and measurement data across many different types of networks, cloud management system 200 may determine the pathways or the number of descriptions for multiple description coding while optimizing overall network performance.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing heterogeneous wireless devices in three or more different types of networks, each type of network using a different type of radio access technology, comprising:
   receiving measurement data from a plurality of heterogeneous wireless devices via a control interface, wherein a heterogeneous wireless device provides connections to client devices via one or more of the three or more radio access technologies;
   searching, using a processor, for optimized adjustments to one or more parameters associated with one or more of the plurality of heterogeneous wireless devices based at least in part on a set of network optimization goals and the measurement data received from the plurality of heterogeneous wireless devices;
   transmitting at least some of the optimized adjustments of the one or more parameters to the one or more of the plurality of heterogeneous wireless devices using the control interface;
   determining that one or more client devices should be handed off from one type of network using a first type of radio access technology to another type of network using a second type of radio access technology, wherein the determination is based at least in part on the measurement data received from the plurality of heterogeneous wireless devices;
   sending an indication to one of the plurality of heterogeneous wireless devices regarding the handoff determination;
   selectively sending a subset of the measurement data received from the plurality of heterogeneous wireless devices to one of the plurality of heterogeneous wireless devices for handoff determination; and
   enabling the one of the plurality of heterogeneous wireless devices to make a determination that one or more client devices should be handed off from one type of network using a first type of radio access technology to another type of network using a second type of radio access technology, and wherein the determination is based at least in part on the subset of the measurement data.

2. The method of claim 1, further comprising:
   discovering a set of configurable parameters corresponding to each of the one or more of the plurality of heterogeneous wireless devices.

3. The method of claim 1, wherein each of the three or more radio access technologies comprises a radio access technology selected from the group consisting of: Wi-Fi technology, second-generation (2G) wireless telephone technology, third-generation (3G) of mobile telecommunications technology, fourth-generation (4G) Long Term Evolution (LTE) mobile telecommunications technology, millimeter wave technology, and cognitive radio technology.

4. The method of claim 1, wherein the plurality of heterogeneous wireless devices comprises heterogeneous wireless devices made by a plurality of different third-party vendors.

5. The method of claim 1, wherein the set of network optimization goals comprises one or more of the following: increasing the average network throughput, increasing the geometric mean throughput, reducing interference, reducing outage probability, reducing delay, increasing coverage, improving fairness, supporting specific quality-of-service metrics for high-priority traffic, reducing network cost or backhaul cost, reducing spectrum cost, and reducing infrastructure cost.

6. The method of claim 1, wherein the set of network optimization goals is configurable to be optimized with respect to a single user or to be optimized with respect to a group of users.

7. The method of claim 1, wherein the searching for optimized adjustments to the one or more parameters comprises evaluating the set of network optimization goals based at least in part on the measurement data.

8. The method of claim 7, wherein the searching for optimized adjustments to the one or more parameters associated with one heterogeneous wireless device comprises evaluating the set of network optimization goals based at least in part on the measurement data, and wherein the one or more parameters comprise parameters associated with a first radio access technology, and wherein the measurement data includes measurement data received from another heterogeneous wireless device, and wherein the measurement data received from the another heterogeneous wireless device comprises measurement data associated with a second radio access technology, and wherein the first radio access technology and the second radio access technology are different radio access technologies.

9. The method of claim 1, further comprising:
determining a set of pathways for a message sent by linear network coding, wherein the set of pathways traverse some of the different types of networks, and wherein the determination is based at least in part on the measurement data received from the plurality of heterogeneous wireless devices.

10. The method of claim 1, further comprising:
determining a set of pathways for packets sent by multiple description coding, wherein the set of pathways traverses some of the different types of networks, and wherein the determination is based at least in part on the measurement data received from the plurality of heterogeneous wireless devices.

11. A cloud management system for managing heterogeneous wireless devices in three or more different types of networks, each type of network using a different type of radio access technology, comprising:
a control interface in communication with a plurality of heterogeneous wireless devices;
a processor; and
a memory coupled with the processor, wherein the memory is configured to provide the processor with instructions which when executed cause the processor to:
receive measurement data from a plurality of heterogeneous wireless devices via the control interface, wherein a heterogeneous wireless device provides connections to client devices via one or more of the three or more radio access technologies;
search for optimized adjustments to one or more parameters associated with one or more of the plurality of heterogeneous wireless devices based at least in part on a set of network optimization goals and the measurement data received from the plurality of heterogeneous wireless devices; and
transmit at least some of the optimized adjustments of the one or more parameters to the one or more of the plurality of heterogeneous wireless devices using the control interface;
determine that one or more client devices should be handed off from one type of network using a first type of radio access technology to another type of network using a second type of radio access technology, wherein the determination is based at least in part on the measurement data received from the plurality of heterogeneous wireless devices;
send an indication to one of the plurality of heterogeneous wireless devices regarding the handoff determination;
selectively send a subset of the measurement data received from the plurality of heterogeneous wireless devices to one of the plurality of heterogeneous wireless devices for handoff determination; and
enable the one of the plurality of heterogeneous wireless devices to make a determination that one or more client devices should be handed off from one type of network using a first type of radio access technology to another type of network using a second type of radio access technology, and wherein the determination is based at least in part on the subset of the measurement data.

12. The cloud management system recited in claim 11, wherein the memory is further configured to provide the processor with instructions which when executed cause the processor to:
discover a set of configurable parameters corresponding to each of the one or more of the plurality of heterogeneous wireless devices.

13. The cloud management system recited in claim 11, wherein each of the three or more radio access technologies comprises a radio access technology selected from the group consisting of: Wi-Fi technology, second-generation (2G) wireless telephone technology, third-generation (3G) of mobile telecommunications technology, fourth-generation (4G) Long Term Evolution (LTE) mobile telecommunications technology, millimeter wave technology, and cognitive radio technology.

14. The cloud management system recited in claim 11, wherein the plurality of heterogeneous wireless devices comprises heterogeneous wireless devices made by a plurality of different third-party vendors.

15. The cloud management system recited in claim 11, wherein the set of network optimization goals comprises one or more of the following: increasing the average network throughput, increasing the geometric mean throughput, reducing interference, reducing outage probability, reducing delay, increasing coverage, improving fairness, supporting specific quality-of-service metrics for high-priority traffic, reducing network cost or backhaul cost, reducing spectrum cost, and reducing infrastructure cost.

16. The cloud management system recited in claim 11, wherein the searching for optimized adjustments to the one or more parameters comprises evaluating the set of network optimization goals based at least in part on the measurement data.

17. The cloud management system recited in claim 16, wherein the searching for optimized adjustments to the one or more parameters associated with one heterogeneous wireless device comprises evaluating the set of network optimization goals based at least in part on the measurement data, and wherein the one or more parameters comprise parameters associated with a first radio access technology, and wherein the measurement data includes measurement data received from another heterogeneous wireless device, and wherein the measurement data received from the another heterogeneous wireless device comprises measurement data associated with a second radio access technology, and wherein the first radio access technology and the second radio access technology are different radio access technologies.

18. The cloud management system recited in claim 11, wherein the memory is further configured to provide the processor with instructions which when executed cause the processor to:
   determine a set of pathways for a message sent by linear network coding, wherein the set of pathways traverses some of the different types of networks, and wherein the determination is based at least in part on the measurement data received from the plurality of heterogeneous wireless devices.

19. The cloud management system recited in claim 11, wherein the memory is further configured to provide the processor with instructions which when executed cause the processor to:
   determine a set of pathways for packets sent by multiple description coding, wherein the set of pathways traverses some of the different types of networks, and wherein the determination is based at least in part on the measurement data received from the plurality of heterogeneous wireless devices.

20. A computer program product for managing heterogeneous wireless devices in three or more different types of networks, each type of network using a different type of radio access technology, the computer program product being embodied in a tangible non-transitory computer readable storage medium and comprising computer instructions for:
   receiving measurement data from a plurality of heterogeneous wireless devices via a control interface, wherein a heterogeneous wireless device provides connections to client devices via one or more of the three or more radio access technologies;
   searching for optimized adjustments to one or more parameters associated with one or more of the plurality of heterogeneous wireless devices based at least in part on a set of network optimization goals and the measurement data received from the plurality of heterogeneous wireless devices;
   transmitting at least some of the optimized adjustments of the one or more parameters to the one or more of the plurality of heterogeneous wireless devices using the control interface;
   determining that one or more client devices should be handed off from one type of network using a first type of radio access technology to another type of network using a second type of radio access technology, wherein the determination is based at least in part on the measurement data received from the plurality of heterogeneous wireless devices;
   sending an indication to one of the plurality of heterogeneous wireless devices regarding the handoff determination;
   selectively sending a subset of the measurement data received from the plurality of heterogeneous wireless devices to one of the plurality of heterogeneous wireless devices for handoff determination; and
   enabling the one of the plurality of heterogeneous wireless devices to make a determination that one or more client devices should be handed off from one type of network using a first type of radio access technology to another type of network using a second type of radio access technology, and wherein the determination is based at least in part on the subset of the measurement data.

\* \* \* \* \*